(12) United States Patent
Hedhli et al.

(10) Patent No.: US 8,039,160 B2
(45) Date of Patent: Oct. 18, 2011

(54) MULTI-LAYER POLYELECTROLYTE MEMBRANE

(75) Inventors: Lotfi Hedhli, King of Prussia, PA (US); Isabelle Decker, Le Fantanil (FR); Patrick M. Piccione, Devon, PA (US); Holger Amort, Mobile, AL (US); Scott R. Gaboury, Blue Bell, PA (US); Fabienne Piroux, Sur Saone (FR)

(73) Assignee: Arkema Inc., King of Prussia, PA (US)

( * ) Notice: Subject to any disclaimer, the term of this patent is extended or adjusted under 35 U.S.C. 154(b) by 1624 days.

(21) Appl. No.: 10/891,464

(22) Filed: Jul. 14, 2004

(65) Prior Publication Data

US 2006/0014067 A1    Jan. 19, 2006

(51) Int. Cl.
*H01M 8/10*      (2006.01)

(52) U.S. Cl. .................................. 429/447; 429/309

(58) Field of Classification Search .............. 429/447, 429/309, 317, 483, 494, 506
See application file for complete search history.

(56) References Cited

U.S. PATENT DOCUMENTS

| | | | |
|---|---|---|---|
| 3,051,677 A | 8/1962 | Rexford | |
| 3,178,399 A | 4/1965 | Lo | |
| 3,475,396 A | 10/1969 | McCain et al. | |
| 3,857,827 A | 12/1974 | Dohany | |
| 4,039,634 A | 8/1977 | Couchoud | 260/895 |
| 4,295,952 A | 10/1981 | De Nora et al. | 204/252 |
| 4,569,978 A | 2/1986 | Barber | 526/206 |
| 4,617,163 A | 10/1986 | Smith | 264/235.6 |
| 5,093,427 A | 3/1992 | Barber | 525/276 |
| 5,190,834 A * | 3/1993 | Kendall | 429/31 |
| 5,272,186 A | 12/1993 | Jones | 523/339 |
| 5,510,160 A | 4/1996 | Jadamus et al. | 428/36.91 |
| 5,540,837 A | 7/1996 | Lunkwitz et al. | 210/490 |
| 5,554,426 A | 9/1996 | Röber et al. | 428/36.91 |
| 5,679,482 A | 10/1997 | Ehrenberg et al. | 429/249 |
| 5,795,668 A | 8/1998 | Banerjee | 429/33 |
| 5,880,204 A | 3/1999 | McCarthy | 524/520 |
| 5,962,140 A | 10/1999 | Rajagopalan | 428/421 |
| 6,011,074 A | 1/2000 | Sorenson et al. | 521/26 |
| 6,025,092 A | 2/2000 | Doyle et al. | 429/213 |
| 6,252,000 B1 | 6/2001 | O'Brien | 525/199 |
| 6,680,357 B1 | 1/2004 | Hedhli et al. | 525/326 |
| 6,780,935 B2 | 8/2004 | Hedhli et al. | 525/191 |
| 2003/0064267 A1* | 4/2003 | Hedhli et al. | 429/33 |

(Continued)

FOREIGN PATENT DOCUMENTS

EP      0029316      5/1981

(Continued)

OTHER PUBLICATIONS

U.S. Appl. No. 10/891,463, filed Jul. 14, 2004, Hedhli et al.

(Continued)

*Primary Examiner* — Jennifer Michener
*Assistant Examiner* — Monique Wills
(74) *Attorney, Agent, or Firm* — Thomas F. Roland

(57) ABSTRACT

Multi-layer polyelectrolyte membranes are described wherein at least one of the layers contains at least one acrylic resin or vinyl resin having at least one ionic or ionizable group, and at least one additional polymer. The polymer has small or large domain sizes with respect to the acrylic resin or vinyl resin that is present in one or more layers. The polymer preferably has improved conductivity when formed into a film. The membranes are useful in batteries, fuel cells, and the like.

48 Claims, 4 Drawing Sheets

EHT = 4.00 kV   1 μm*
Mag = 10.00 KX |———|

Using no ammonium counterion
(conductivity = 17 mS/cm)

U.S. PATENT DOCUMENTS

| | | | |
|---|---|---|---|
| 2003/0204018 A1 | 10/2003 | Granel et al. | 525/100 |
| 2004/0092661 A1 | 5/2004 | Hedhli et al. | 525/55 |
| 2004/0175498 A1 | 9/2004 | Hedhli et al. | 427/248.1 |
| 2004/0175625 A1 | 9/2004 | Hedhli et al. | 429/306 |

FOREIGN PATENT DOCUMENTS

| | | |
|---|---|---|
| EP | 143605 A2 | 6/1985 |
| EP | 1 202 365 A1 | 5/2002 |
| WO | WO 97/41168 | 11/1997 |
| WO | WO 98/20573 A1 | 5/1998 |
| WO | WO 98/22989 | 5/1998 |
| WO | WO 99/67304 | 12/1999 |
| WO | WO 02/075835 | 9/2002 |

OTHER PUBLICATIONS

Paronen et al., "Effects of Irradiation on Sulfonation of Poly(vinyl fluoride)," *J. Mater. Chem.*, 1997, vol. 7, No. 12, pp. 2401-2406.

Holmberg et al., "Structure and properties of sulfonated poly[(vinylidene fluoride)-g-styrene] porous membranes," *J. Material Chem.* 1996, vol. 6, No. 8, pp. 1309-1317.

Moore et al., "Barriers to flow in semicrystalline ionomers. A procedure for preparing melt-processed perfluorosulfonate ionomer films and membranes,"*J. Membrane Sci.*, vol. 75, pp. 7-14, (1992).

Boucher-Sharma et al., "Removal of n-butanol from aqueous solutions by ion-exchange membranes containing organic counterions," *J. Appl. Polym. Sci.*, vol. 74, pp. 47-58 (1999).

Berezina et al., "Transport-strucutral parameters of perfluorinated membranes Nafion-117 and MF-4SK," *Russian J. Electrochemistry*, vol. 38, No. 8, pp. 903-908 (2002).

Pasternac et al., "Preferential removal of alcohols from aqueous solutions by ion exchange membranes containing organic counterions," *J. Polym. Sci., A: Polym. Chem.*, vol. 29, No. 6, pp. 915-917 (1991).

Feldheim et al., "Influence of the sulfonate counteraction on the thermal stability of Nafion® perfluorosulfonate membranes,"*J. Polym. Sci., B: Polym. Physics*, vol. 31, No. 8, pp. 953-957 (1993).

Cable et al., "Effects of hydrophilic and hydrophobic counterions on the coulombic interactions in perfluorosulfonate ionomers," *J. Polym Sci. B: Polym. Physics*, vol. 33, No. 7, pp. 1065-1072 (1995).

Landis et al., "Blends of a Perfluorosulfonate Ionomer with Poly(vinylidene fluoride): Effect of Counterion Type on Phase Separation and Crystal Morphology," *Macromolecules*, 2000, vol. 33, pp. 6031-6041.

Friestad et al., "Electrochemical properties of a proton conducting polymer," *Ionics 3*, pp. 214-222 (1997).

Lin et al., "Study of Blend Membranes Consisting of Nafion® and Vinylidene Fluoride-Hexafluoropropylene Copolymer," *Journal of Applied Polymer Science*, vol. 70 (1998), pp. 121-127.

International Search Report for PCT/US01/04995, dated May 5, 2001.

* cited by examiner

EHT = 4.00 kV  1μm*
Mag = 10.00 KX |———|

Using no ammonium counterion
(conductivity = 17 mS/cm)

EHT = 4.00 kV  1μm*
Mag = 10.00 KX |———|

Using ammonium counterion
(conductivity = 90 mS/cm)

MULTI-LAYER POLYELECTROLYTE MEMBRANE

BACKGROUND OF THE INVENTION

The present invention relates to multi-layer polyelectrolyte membranes containing polymeric resins, for instance and more specifically to fluoropolymer and non-perfluorinated polymeric resins containing ionic and/or ionizable groups (also referred to as a "polyelectrolyte"), which are useful in a variety of products such as fuel cells and the like. The present invention further relates to methods of making these multi-layer polyelectrolyte membranes.

Perfluorocarbon ionic exchange membranes provide high cation transport, and have been extensively used as ionic exchange membranes. Polymeric ion exchange membranes can be referred to as solid polymer electrolytes or polymer exchange membranes (PEM). Because of the severe requirements for fuel cell applications, the most commonly used membranes, and commercially available, are made from perfluorosulfonated Nafion®, Flemion® and Aciplex® polymers. However, reports and literature describe these membranes as working well but show several limitations that prevent developing the technology further to commercialization. Additionally, they work better with gaseous fuels than with liquid fuels which may be mainly due to liquid fuel crossover that diminishes cell performance. A membrane's chemical resistance and mechanical strength are important properties for fuel cell applications. Indeed, the membrane is often subjected to high differential pressure, hydration-dehydration cycles, as well as other stressful conditions. Also, mechanical strength becomes important when the membrane is very thin such as less than 50 microns. Further, when used with fuel cells or battery applications, the membrane sits in a very acidic medium at temperatures that can reach 200° C., in an oxidizing and/or reducing environment due to the presence of metal ions and sometimes the presence of solvents. This environment requires that the membrane be chemically and electrochemically resistant, as well as thermally stable.

Currently, many fluorine-containing membranes can suffer from one or more of the following short comings:

i) high liquid and gas crossover through the membrane;
ii) heterogeneous blending between the fluorinated polymer and other polymers that leads to inferior properties;
iii) insufficient chemical resistance in the presence of some liquid fuels;
iv) poor electrochemical resistance;
v) lack of heterogeneous distribution of sulfonated groups;
vi) poor mechanical properties; and/or
vii) poor thermal stability.

U.S. Pat. No. 4,295,952 to de Nora et al. relates to cationic membranes which have partly sulfonated tripolymers of styrene, divinylbenzene, and at least one of 2-vinylpyridine, 4-vinylpyridine, and/or acrylic acid.

U.S. Pat. No. 5,679,482 to Ehrenberg et al. relates to fuel cells incorporating an ion-conducting membrane having ionic groups. The polymer forming the membrane contains styrene which has been sulfonated using a sulfonation agent. The sulfonation can take place with the monomer or polymer.

U.S. Pat. No. 5,795,668 describes a fuel cell containing a MEA with a reinforced polymeric ion exchange membrane (PEM) using Nafion® type polymers. The PEM is based on a fluorinated porous support layer and a reinforced ion exchange membrane with an equivalent weight of about 500 to 2000 and a preferred ion exchange capacity of from 0.5 to 2 meq/g dry resin. The porous support layer is made of certain PTFE and PTFE copolymers. The membrane is a perfluorinated polymer with side chains containing —$CF_2CF_2SO_3H$. It is known from the literature that Nafion® type polymers can have mechanical failure in methanol fuel cells as well as problems with liquid crossover.

WO 97/41168 to Rusch relates to a multi-layered ion-exchange composite membrane having ionic exchange resins, such as fluorinated or non-fluorinated polystyrene based sulfonates and sulfonated polytetrafluoroethylenes.

WO 98/20573 A1 describes a fuel cell containing a highly fluorinated lithium ion exchange polymer electrolyte membrane (PEM). The PEM is based on an ion exchange membrane which is imbibed with an aprotic solvent.

WO 98/22989 describes a polymeric membrane containing polystyrene sulfonic acid and poly(vinylidene fluoride), which provides reduced methanol crossover in direct methanol fuel cell (DMFC) use. However, the polymer blending process described does not provide an acceptable blend and the sulfonation steps are complicated.

Holmberg et al., (J. Material Chem. 1996, 6(8), 1309) describes the preparation of proton conducting membranes by irradiation grafting of styrene onto PVDF films, followed by sulfonation with chlorosulfonic acid. In the present invention, a sulfonation step is not required since the sulfonated group can be incorporated using a sulfonated monomer.

U.S. Pat. No. 6,252,000 relates to a blend of fluorinated ion exchange/non-functional polymers. Specific examples include perfluorinated sulfonyl fluoride polymer/poly (CTFE-co-perfluorodioxolane) blends.

WO 99/67304 relates to an aromatic perfluorinated ionomer prepared by the copolymerization of sulfonated aromatic perfluorinated monomer with acrylic monomers. The sulfonated group that is present is in the fluorinated aromatic chain of the polymer.

U.S. Pat. No. 6,025,092 relates to a perfluorinated ionomer wherein a VDF monomer is polymerized with a sulfonated monomer.

Moore et al., (J. Membrane Sci., 1992, 75, 7) describes a procedure for preparing a melt-processable form of perfluorosulfonate ionomers utilizing bulky tetrabutyl ammonium counterions as internal plasticizers to yield the desired melt-flow properties.

Boucher-Sharma et al., (J. Appl. Polym. Sci., 1999, 74, 47), describes the application of pervaporation of aqueous butenol solutions using a thin film composite composed of PVDF coated with a sulfonated poly(2,6-dimethyl-1,4-phenylene oxide)polymer. The polymer is then ion exchanged with quaternary ammonium cations having aliphatic substituents of varying chain lengths.

U.S. Pat. No. 6,011,074 relates to use of quaternary ammonium cations to enhance the ion-exchange properties of perfluorosulfonated ionomers.

Berezina et al. (Russian J. Electrochemistry, 2002, 38(8), 903), describes the effect of tetraalkyl ammonium salts on the transport and structural parameters of perfloronated membranes including Nafion®-117 and MF4SK. They observe that specific adsorption of organic ions makes the water clusters of the polymers disintegrate and the elasticity of side segments diminish thereby significantly decreasing the proton conductivity of the polymer films.

Pasternac et al., (J. Polym. Sci., A: Polym. Chem., 1991, 29(6), 915) relates to the application of pervaporative membranes for C2-C4 alkanes, and demonstrates that when Nafion®-117 is treated with tetraalkyl ammonium bromides, the separation factor increases with increasing counterion organic chain length.

Smith et al. in European Patent No. 143,605 A2 describes a process where the membrane is cation exchanged with tetraalkyl ammonium ions and expanded by dry stretching to yield a membrane useful for electrolysis.

Feldheim et al., (J. Polym. Sci., B: Polym. Physics, 1993, 31(8), 953) shows a strong dependence of Nafion® thermal stability on the nature of the counterion. Metal salts and alkyl ammonium salts were studied. The thermal stability of the membrane is shown to improve as the size of the counterion decreases. This inverse relationship of thermal stability with counterion size is attributed to an initial decomposition reaction which is strongly influenced by the strength of the sulfonate-counterion interaction.

The neutralization of Nafion® by tetrabutyl ammonium hydroxide was further studied in various publications by Moore et al. See, for example, Polymer Chemistry, 1992, 31(1), 1212; Polymer Chemistry, 1995, 36(2), 374, J. Polym. Sci. B: Polym. Physics, 1995, 33(7), 1065, and Macromolecules, 2000, 33, 6031.

Furthermore, sulfonated acrylic or sulfonated vinylic polymers are described for use in superabsorbents, diapers, and contact lenses, for instance. (See J. Mater. Chem., 1996, 6(a), 1309 and Ionics, 1997, 3, 214.) However, such types of products have not been described for application as membranes for polyelectrolyte membranes and the like. All patents, publications, and applications mentioned above and throughout this application are incorporated by reference in their entirety and form a part of the present application.

Thus, there is a need to overcome one or more of these limits and to develop a membrane that can be used for applications in fuel cells, such as liquid fuel cells. More particularly, there is a need to develop a polyelectrolyte to make membranes directly from aqueous or non-aqueous dispersions or solutions. Also, there is a need to provide compositions and methods of synthesis as well as methods of using water or non-aqueous dispersions of polyelectrolyte having sulfonated or other functionalities. Further, there is a need to provide a method that is easier and environmentally friendly. In addition, those skilled in the art would prefer a polyelectrolyte membrane having a higher chemical resistance and mechanical strength.

SUMMARY OF THE INVENTION

Accordingly, a feature of the present invention is to provide polyelectrolytes with higher conductivities.

A further feature is to provide multi-layer polyelectrolyte membranes wherein at least one layer has acrylic and/or vinyl resin that is uniformly distributed in a second polymer, such as fluoropolymer.

Another feature of the present invention is to provide polyelectrolytes having ionic functionalities.

An additional feature of the present invention is to provide a polyelectrolyte membrane having high chemical resistance and/or mechanical strength.

Another feature of the present invention is to provide polymers that can be formed as a component in polyelectrolyte membranes that avoid one or more of the shortcomings described above, such as avoiding a high liquid crossover through the membrane.

A further feature of the present invention is to provide membranes that can be made directly from a dispersion or solution of a polymer.

Another feature of the present invention is to provide polyelectrolyte without separate sulfonation steps.

An additional feature of the present invention is to provide a multi-layer polyelectrolyte membrane as well as the fuel cell using the membrane which preferably has acceptable fuel crossover and/or reduced areal resistance.

To achieve these and other advantages and in accordance with the purpose of the present invention, as embodied and broadly described herein, the present invention relates to a multi-layer polyelectrolyte membrane wherein at least one layer includes at least one acrylic and/or vinyl resin or both having at least one ionic or ionizable group, and at least one additional polymer. The ionic or ionizable group is preferably present in an amount of from about 200 to about 2,500 EW. Furthermore, the polyelectrolyte membrane preferably has a methanol crossover rate of $5 \times 10^{-16}$ mol/cm$^2$/s or lower and/or has an areal resistance of 0.3 $\Omega$cm$^2$ or lower. Furthermore, the overall thickness of the multi-layer polyelectrolyte membrane can be about 10 mils or less, for example, from about 0.5 to about 5 mils. The polymer preferably has an EW of from about 200 to about 8,000, and preferably from about 900 to about 1,400. The domain size of the acrylic resin and/or vinyl resin in the polymer or polymer blend can be any size. Also, or in the alternative, the composition, when formed into a film, has a conductivity of 20 mS/cm or greater.

The present invention further relates to a fuel cell, battery, or other devices containing the membrane of the present invention.

In addition, the present invention relates to a membrane electrode assembly including the above-mentioned membrane, and relates to a fuel cell using this membrane electrode assembly.

DETAILED DESCRIPTION OF THE PRESENT INVENTION

Perfluorinated polyelectrolyte membranes are used to provide high cation transport, and have been extensively used as ion exchange membranes. Polymeric ion exchange membranes are referred to as solid polymer electrolytes or polymer exchange membrane (PEM).

The most commonly used membrane, and commercially available, are Nafion® and Aciplex®. However, there are very few non-perfluorinated polyelectrolyte membranes described in the literature. This is due to the fact that the membrane's chemical resistance, electrochemical resistance and mechanical strength are important properties for a fuel cell application. Indeed, the membrane is often subject to high differential pressure. In addition, mechanical strength becomes important when the membrane is very thin (less than 50 microns). When used for fuel cell or battery application, the membrane sits in a very acidic medium at temperatures that could reach 200° C., and in the presence of metal ions, solvents, and the like, thus requiring high chemical resistance as well as electrochemical resistance. Those requirements are often met when a fluorinated base is used because fluorinated materials have inherent chemical and electrochemical resistance. However, these membranes show limitations including but not limited to poor mechanical properties at elevated temperatures (70-200° C. range), crossover, and mechanical failure after repeated hydration-dehydration cycling. Additionally, preparing those perfluorinated polyelectrolytes requires several steps and involves chemistry that induces a high cost. Developing a chemistry that is easy and cheap will further alleviate commercialization barriers for fuel cells.

Figure 1:
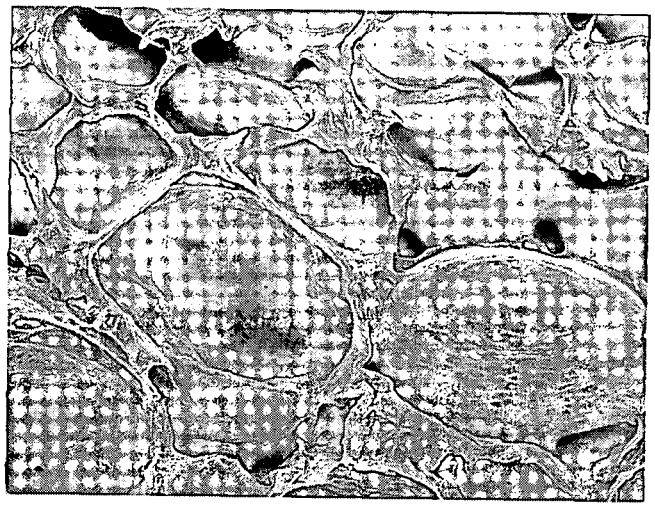
FIG. 1 is a SEM photo of a polymer blend of an acrylic resin or vinyl resin having at least one ionic or ionizable group and at least one thermoplastic fluoropolymer. This polymer blend was made using previous techniques and shows domain sizes which are over 1,000 nm.
Figure 2:
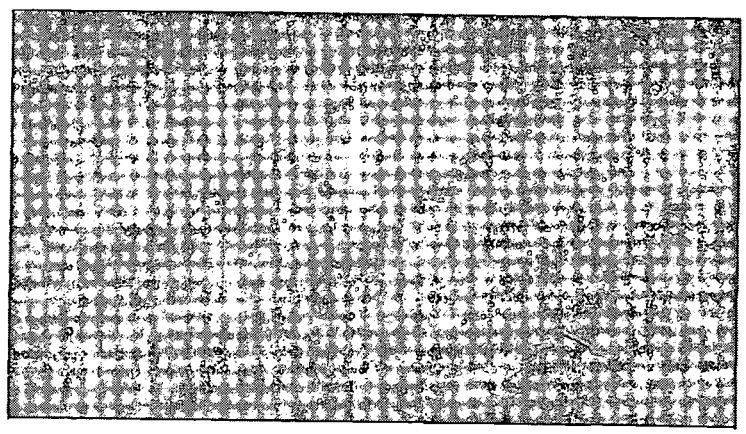
FIG. 2 is a SEM photo of a polymer blend of the present invention which shows domain sizes below 500 nm and shows domain sizes which are barely detectable.
Figure 3:
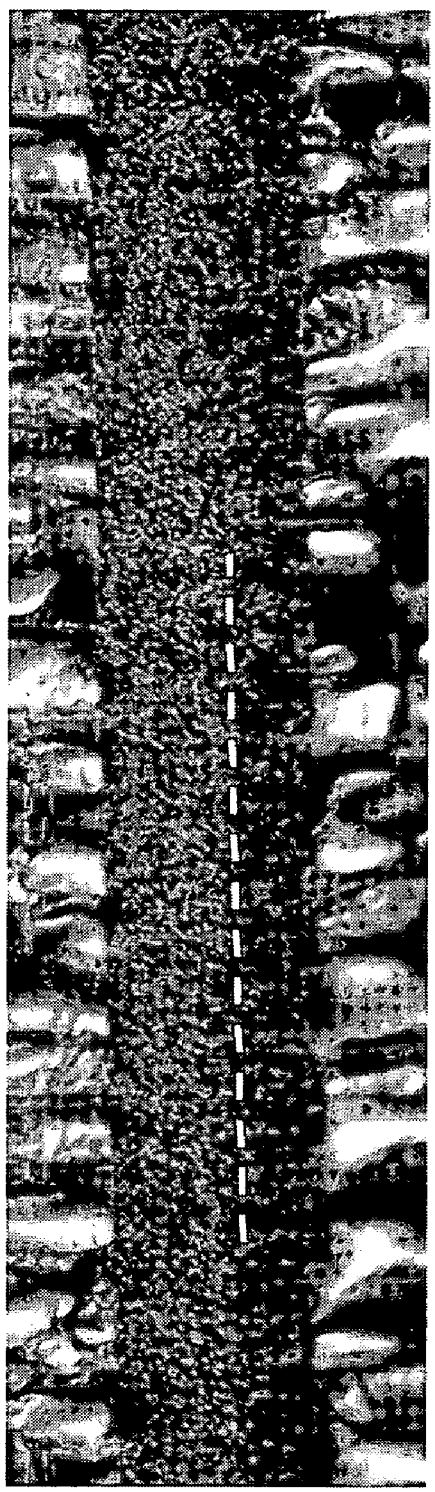
FIG. 3 is a Differential Interference Contrast image (cryomicrotomed cross-sectional optical microscopy) of a bilayer membrane. The white line indicates the separation between the layers.
Figure 5:
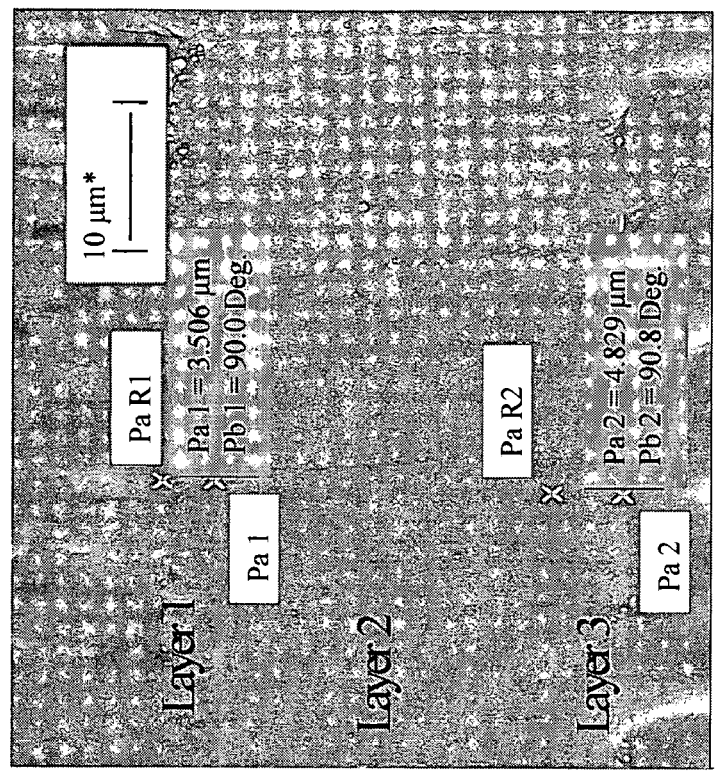
FIGS. 4 and 5 are SEM photos of multi-layer membranes of the present invention.
Figure 4:
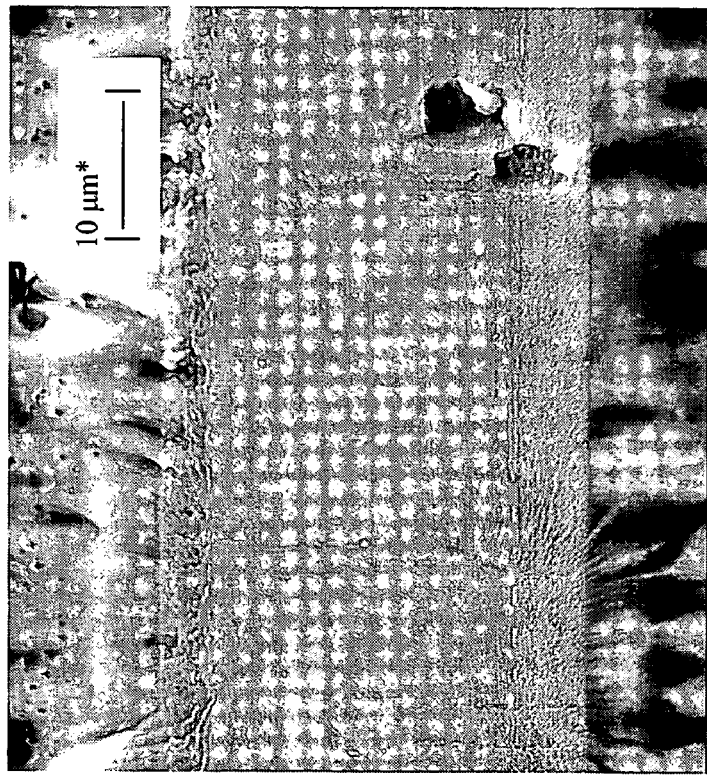
Figure 6:
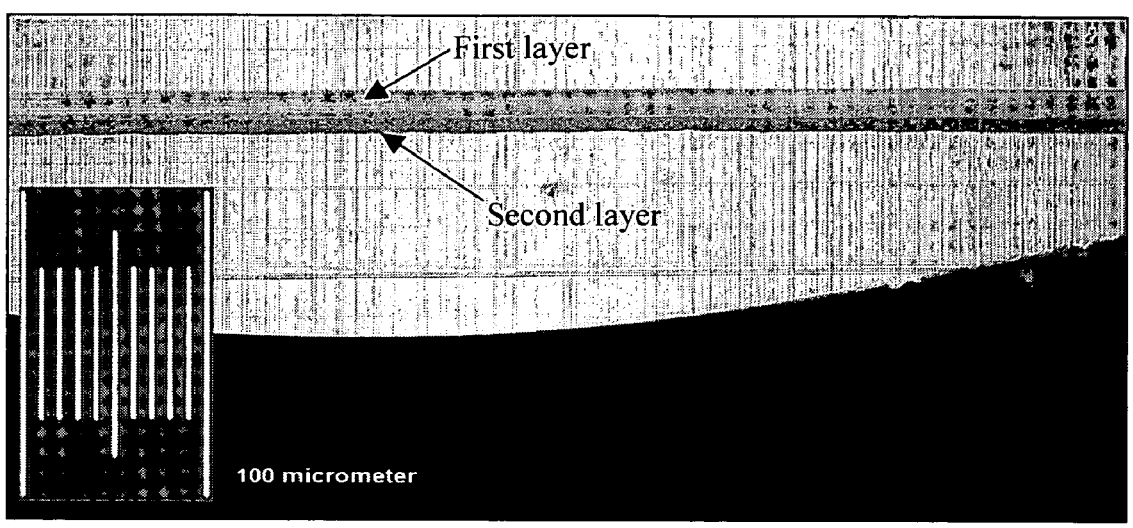
FIG. 6 is a SEM photo of a multi-layer membrane of the present invention as well.

The present invention is an improvement over the invention described in U.S. patent application Publication No. US 2003/0064267 A1 which describes a polymer blend containing at least one acrylic resin or vinyl resin having at least one ionic or ionizable group and at least one thermoplastic fluoropolymer. Furthermore, the present invention is an improvement over U.S. patent application Ser. No. 10/383,026, filed Mar. 6, 2003, which describes a polymer blend containing at least one acrylic resin or vinyl resin having at least one ionic or ionizable group and at least one non-perfluoropolymer which can include partial fluorination or no fluorination at all. Both of these applications are incorporated in their entirety by reference herein and form a part of the present application. While these inventions as described in these two applications are quite beneficial and have advanced the state of the art, there is always a desire in the industry to provide improvements in PEMs and the use of PEMs in fuel cells. The present invention provides multi-layer polyelectrolyte membranes such that the domain sizes of the various polymers (e.g., acrylic resin or vinyl resin) can be any size. As shown in FIG. 1, which is a SEM photo of a polymer blend having at least one acrylic resin or vinyl resin having at least one ionic or ionizable group and a thermoplastic fluoropolymer, domain sizes are quite visual under magnification. The domain sizes at times can be over 1,000 nm. The domain sizes of the acrylic resin or vinyl resin present in the polymer blend can be alternatively below 1,000 nm, such as below 500 nm and preferably below 100 nm, and even more preferably below 50 nm in size. As shown in FIG. 2 in using one embodiment of the present invention, the domain sizes are practically not detectable. In addition, the conductivity of a film formed using the multi-layer structure, irrespective of the domain sizes of the acrylic resin or vinyl resin present in the polymer blends of the present invention, is significantly improved as will be discussed in more detail below.

The present invention relates to multi-layer polyelectrolyte membranes wherein at least one of the layers contains a polyelectrolyte which contains at least one acrylic and/or vinyl resin or polymer which bears at least one ionic or ionizable group, such as a sulfonated and/or phosphonated group. As part of the present invention, at least one additional polymer can be present with the acrylic and/or vinyl resin to form a polymer blend. This additional polymer can be a fluoropolymer (perfluoro or non-perfluoro) or a non-fluoropolymer. Preferably, the additional polymer is at least one thermoplastic fluoropolymer. In another embodiment, the polymer or blend thereof does not contain any perfluoropolymer or as an option no fluoropolymers. In one embodiment, the polyelectrolyte is non-perfluorinated and can be present with no other polymers (i.e., it is not present as a blend, or put another way, the non-perfluorinated polyelectrolyte is used alone). In another embodiment, the polyelectrolyte is non-perfluorinated and is present with one or more other polymers, for instance, as a blend, such as with thermoplastic non-perfluoropolymers. By perfluoro, it is to be understood that all hydrogens that are attached to carbon atoms are completely replaced with fluorine. As an option, in the present invention, some of the hydrogens can be replaced with fluorine or all of them. Thus, partial fluorination is possible or no fluorination at all.

The polyelectrolyte contained in at least one layer can be the resulting product from blending a) a polyelectrolyte having acrylic or vinyl units or both and at least one ionic or ionizable group and b) at least one additional polymer wherein a) and b) are different from one another.

The polyelectrolyte present in at least one layer can also be a composition comprising the polymer product of at least one polymerizable vinyl and/or acrylic containing monomer and at least one monomer comprising at least one ionic or ionizable group or both, wherein the polymerization preferably occurs in the presence of an aqueous dispersion.

In the above-identified embodiments, as well as any embodiment herein, the domain size of the acrylic resin and/or vinyl resin or polymer in the polymer or polymer blend can be any size. For instance, the domain size can be from about 1 nm to about 1,200 nm or more. Specific examples include, but are not limited to, 700 nm to 1,200 nm, about 500 nm to 700 nm, about 500 nm or less, about 100 nm or less or about 75 nm or less, and about 50 nm or less. The domain sizes discussed herein are with respect to maximum domain sizes and/or average domain sizes. In a preferred embodiment, the domain sizes recited are the maximum domain sizes, but can be the average domain sizes. Other suitable domain size ranges include, but are not limited to, from about 1 nm to about 500 nm, from about 1 nm to about 100 nm, from about 1 nm to about 75 nm, from about 1 nm to about 50 nm, from about 10 nm to about 100 nm, from about 10 nm to about 75 nm, or from about 10 nm to about 50 nm, or from about 1 nm to about 25 nm, or any values or ranges in between these various sizes. Again, these domain sizes are with respect to maximum domain sizes and/or average domain sizes. These domain sizes are preferably the case where the blend is formed into a film, layer, or membrane. Also, or in the alternative, the polymer or polymer blends of the present invention when formed into a film or membrane preferably have a conductivity of 20 mS/cm or greater, more preferably 50 mS/cm or greater, even more preferably 75 mS/cm or greater, or 100 mS/cm or greater, or from about 20 mS/cm to about 300 mS/cm. Other conductivity ranges include, but are not limited to, from about 50 mS/cm to about 200 mS/cm, from about 75 mS/cm to about 200 mS/cm, from about 80 mS/cm to about 180 mS/cm, from about 90 mS/cm to about 175 mS/cm, from about 100 mS/cm to about 180 mS/cm and any values or ranges in between these various amounts. As stated, the polymer or polymer blends of the present invention can have these desirable conductivities alone or in combination with the domain sizes described herein. Preferably, the polymer or polymer blends of the present invention have both the preferred domain sizes and conductivities described herein.

The polymer blend used in the present invention can be any type of mixture of the two polymers described above and throughout this application. Preferably, the polymer blend is an intimate blend of the two polymers. For instance, the polymer blend can be a polymer blend wherein one of the polymers at least partially coats onto the other polymer. Preferably, in emulsion or suspension polymerization, the fluoropolymer is coated by the acrylic or vinyl resin or the polymer formed from at least one polymerized vinyl or acrylic containing monomer and at least one monomer comprising at least one ionic or ionizable group or both is the shell. As stated earlier, the acrylic or vinyl resin can partially coat or fully coat the fluoropolymer in the preferred embodiment. Preferably, the attachment between the acrylic resin and the fluoropolymer is a physical attachment though attachments other than physical attachments are within the bounds of the present invention including chemical attachments. In the preferred embodiment, the particle typically has a particle size of from about 90 to about 500 nm, and more preferably from about 50 to about 300 nm. The amount of fluoropolymer can be from about 5 to about 95 weight % and the amount of the acrylic or vinyl resin can be from about 95 to about 5 weight %. Preferably, the fluoropolymer is present in an amount of from about 40% to about 80 weight % and the amount of acrylic or vinyl resin is from about 20 to about 60 weight %.

With respect to the fluoropolymer, this fluoropolymer can be a homopolymer or other type of polymer, and can be a mixture of fluoropolymers or a mixture of fluoropolymer with a non-fluoropolymer. Preferably, a thermoplastic fluoropolymer is used. Preferably, this fluoropolymer or mixtures of fluoropolymers can be any fluoropolymer(s) which can form a polymer blend with the other components, including other polymers present. Preferably, the fluoropolymer is a poly(vinylidene fluoride) polymer such as a poly(vinylidene fluoride) homopolymer. Other examples of fluoropolymers include, but are not limited to, a poly(alkylene) containing at least one fluorine atom, such as polyhexafluoropropylene, polytetrafluoroethylene, poly(vinyl fluoride), or combinations thereof. More preferably, the fluoropolymer is a polymeric composition containing from about 30% to about 100 weight % of vinylidene fluoride and from 0% to about 70 weight % of at least one poly(alkylene) containing at least one fluorine atom, such as, hexafluoropropylene, tetrafluoroethylene, trifluoroethylene (VF3), chlorotrifluoroethylene, and/or vinyl fluoride. Preferably, the molecular weight of the fluoropolymer which can include homopolymers, copolymers, terpolymers, oligomers, and other types of polymers is from about 80,000 MW to about 1,000,000 MW and, more preferably from about 100,000 MW to about 500,000 MW. The fluoropolymers can be prepared using the techniques described in U.S. Pat. Nos. 3,051,677; 3,178,399; 3,475,396; 3,857,827; and 5,093,427, all incorporated herein in their entirety by reference.

With respect to the acrylic resin or polymer, this polymer or resin preferably contains or bears one or more ionic or ionizable groups. Examples of acrylic resins include polymers (including copolymers, terpolymers, oligomers, and the like) of acrylic acids, methacrylic acids, esters of these acids, or acrylonitrile. The acrylic resin can also contain other repeating units as well as combinations of different acrylic acid alkyl esters, methacrylic acid alkyl esters, acrylic acids, methacrylic acids, and acrylonitriles. For purposes of the present invention, the acrylic resin can include other polymerized monomers or can be a mixture of two or more different acrylic resins or can additionally include non-acrylic resins, such as vinyl monomers and styrenic monomers.

Examples of vinyl monomers that can be used in the polyelectrolyte include, but are not limited to, styrene, vinyl acetate, vinyl ethers, vinyl esters such as VeoVa 9 and VeoVa 10 from Shell, vinyl propionate, vinyl pivalate, vinyl benzoate, vinyl stearate, and the like, and any combinations thereof. Preferably, the at least one vinyl monomer or resin does not include an aromatic group. In other words, preferably, the vinyl monomer, resin or polymer is a non-aromatic vinyl resin. Thus, the vinyl resin preferably does not include styrene.

Furthermore, the polyelectrolyte contains at least one ionic (e.g., sulfonate or phosphonate) or ionizable group such as a sulfonated or phosphonated group or sulfonyl groups. An ionizable group is a group capable of forming an ionic group, such as cyclic amino acids, sultones, maleic anhydride, mercaptans, sulfides, phosphalanes, and the like. These groups can be part of the polyelectrolyte by any means such as blending an acrylic and/or vinylic resin in the presence of one or more monomers containing an ionic or ionizable group. In the alternative, one or more of the monomers used to form the polyelectrolyte can contain the ionic or ionizable group. For purposes of the present invention, the ionic or ionizable group is not the acid portion of acrylic acid or a vinyl resin if used. The ionic or ionizable group is a group in addition to any acrylic acid that may be present especially from the acrylic resin or polymer described above.

Besides the components mentioned above with respect to the acrylic and/or vinylic resin, the acrylic and/or vinylic resin can further contain or be formed in the additional presence of one or more additional monomers optionally with any type of functional group as long as these monomers are compatible with the overall formation of the acrylic and/or vinylic resin.

As stated earlier, preferably the acrylic and/or vinylic resin is the result of the polymerization of several monomers, one of which contains the ionic or ionizable group, and the other which contains the acrylic and/or vinylic units of the acrylic and/or vinylic resin. More preferably, the acrylic and/or vinylic resin is formed from polymerizing (1) acrylic acid alkyl esters, (2) methacrylic acid alkyl esters, (3) one or more co-polymerizable monomers which are different from (1) and (2), (4) one or more monomers having at least one functional group, (5) a monomer containing ionic or ionizable groups, such as a sulfonated or phosphonated monomer.

Examples of the acrylic acid alkyl ester (1) include, for example, ethyl acrylate, methyl acrylate, butyl acrylate, propyl acrylate, isobutyl acrylate, amyl acrylate, 2-ethylhexyl acrylate, hexyl acrylate, fluoroalkyl acrylates, and combinations thereof.

Examples of the copolymerizable monomers (3) include, for example, conjugated dienes (e.g., 1,3-butadiene, isoprene), aromatic alkenyl compounds (e.g., styrene, αmethylstyrene, styrene halides), divinyl hydrocarbon compounds (e.g., divinyl benzene), and combinations thereof.

Examples of the methacrylic acid alkyl ester (2) include, for example, ethyl methacrylate, methyl methacrylate, butyl methacrylate, propyl methacrylate, isobutyl methacrylate, amyl methacrylate, 2-ethylhexyl methacrylate, hexyl methacrylate, fluoroalkylmethacrylate, and combinations thereof.

Examples of the functional monomer (4) include, but are not limited to, α, β unsaturated carboxylic acids (e.g., acrylic acid, methacrylic acid, fumaric acid, crotonic acid, itaconic acid); vinyl ester compounds, amide compounds (e.g., acrylamide, methacrylamide, N-methylmethacrylamide, N-methylolmethacrylamide, N-alkylacrylamide, N-alkylacryl methamide, N-dialkyl methacrylamide, N-dialkyl acrylamide); monomers containing hydroxyl group (e.g., hydroxyethyl methacrylate, hydroxyethyl acrylate, hydroxypropyl acrylate, hydroxypropyl methacrylate, diethylene glycol ethyl ether acrylate); monomers containing epoxy groups (e.g., glycidyl acrylate, glycidyl methacrylate), monomers containing silanols (e.g., γtrimethoxysilane methacrylate, γtriethoxysilane methacrylate); monomer containing aldehydes (e.g., acrolein), alkenyl cyanides (e.g., acrylonitrile, methacrylonitrile). The monomers included in (4) can be capable of crosslinking. Examples of copolymerizable monomers capable of crosslinking include isobutyl methacrylamide, glycidyl methacrylate, diethylene glycol dimethacrylate, and trimethyloxysilane methacrylate. Crosslinking might be desirable for improved mechanical properties and solvent resistance.

For some specific applications, low molecular weight copolymerizable polymers or oligomers can be used. Moreover, when a mixture of acrylic acid alkyl ester (1) and methacrylic acid alkyl ester (2) is used, their ratio could be suitably adjusted to achieve the desired properties.

Examples of the monomer containing at least one ionic or ionizable group (5) include, but are not limited to, acrylamid propyl sulfonate, vinyl phosphonic acid, vinyl sulfonic acid, sulfopropyl methacrylate, sulfoethyl methacrylate. These monomers can preferably be used either in their acid form or as a salt derivative. For example, in a seeded emulsion polymerization, the sulfonated monomer can be incorporated in either the first stage or the second stage or both stages. The amount of the ionic group is preferably from about 200 to about 2500 EW, and more preferably from about 200 to about 1100 EW, wherein EW is equivalent weight and is the number of grams of polymer per sulfonated unit. Other amounts can be used.

The polymer of the present invention which contains at least one acrylic or vinyl resin or both having at least one ionic or ionizable group can have an equivalent weight with respect to the acrylic or vinyl resin of from about 200 to about 8,000, such as from about 900 to about 1,400. This equivalent range can provide preferred properties with respect to membrane formation and the ability to avoid the need for fluoropolymers, as an option. The polymer of the present invention can optionally be formed as a blend. Preferably, the polymer of the present invention is crosslinked using conventional crosslinking techniques.

Crosslinking can be done via conventional methods including, but not limited to, self-condensation, addition of a secondary crosslinker, or radiation crosslinking. These are well described in the literature and well known in the art. Examples of monomers able to undergo self condensation crosslinking include N-methylol acrylamide, isobutoxy methacrylamide, N-methylenebisacrylamide, and glycidyl methacrylate. Examples of secondary crosslinkers include free and blocked isocyanates, melamines, epoxies, carboxylates, carboxylic acids, alkoxy silanes, silicones, aziridines, and carbodiimides. Catalysts which can be chosen for the specific crosslinking chemistry and would include organotins, sulfonic acids, or amines. Examples of radiation crosslinking include electron beam, ultraviolet, and gamma radiation.

The polymerization of the mixture of polymerizable vinyl and/or acrylic containing monomers can be carried out separately and then blended with one or more polymer(s), or polymerized in the presence of one or more polymers. The polymerization of the vinyl and/or acrylic containing monomers can be prepared by solution, bulk, emulsion polymerizations, or any other known polymerization methods.

If the polymerization of the mixture of polymerizable vinyl and/or acrylic ionic containing monomer is carried out separately, and then blended with one or more polymers, the blending can be carried out through various conventional ways including, but not limited to, solution blending, extrusion blending, latex blending, and the like. For solution blending, the polymer can be dissolved or dispersed in a solvent. The solvent used for the polymer can be similar or different than the solvent used for the acrylic/vinyl ionic containing polymer. For example, the blending could involve two solvent solutions/dispersions, or a powder added to a solvent solution/dispersion, or the two polymers in the same solvent, or any other combination. Typical solvents used include tetrahydrofurane, acetone, dimethylsulfoxide, dimethylformamide, N-methyl pyrrolidinone. For melt extrusion blending, typical extrusion temperatures range between about 100° C. to about 300° C., preferably from about 150° C. to about 250° C. The material could be extruded such as in the shape of pellets or films. For the case of latex blending, the mixing can take place under various conventional ways: the acrylic/vinyl latex can be mixed with the polymer latex, or the acrylic/vinyl polymer can be dispersed or dissolved in the polymer latex, or any other known mixing. The mixing could involve more than two latexes. The quantity and nature of each latex is adjusted in such a way that the physical and chemical properties expected are obtained, and the expected EW is obtained. In the case of a waterborne membrane (e.g., prepared by direct latex case) the particle size and solids content of one or more latexes can be tailored to the desired properties.

For solvent polymerization, the polymerization can take place using conventional techniques. In the case of a blend with another polymer, the solvent used for the polymer blend can be similar or different than the solvent used for the acrylic/vinyl polymer. For example, the blending could involve two solvent solutions/dispersions, or a powder added to a solvent solution/dispersion, or the two polymers in the same solvent, or any other combination. Typical solvents used include dimethylsulfoxide, dimethylformamide, N-methyl pyrrolidinone, isopropanol, methanol, and the like.

The emulsion polymerization can be carried out under the same conditions as for conventional emulsion polymerizations. A surfactant, a polymerization initiator, a chain transfer agent, a pH regulator, and eventually a solvent and a chelating agent, are preferably added to the seed latex, and the reaction is carried out under suitable reaction conditions of sufficient pressure, temperature, and time, such as under atmospheric pressure, from about 0.5 to about 6 hours at temperatures typically of from about 20 to about 150° C., more preferably from about 40 to about 80° C.

In the case of a particle, the particle can have a particle size of from about 90 or less to about 500 nm or more, and more preferably from about 50 to about 300 nm, wherein the amount of polymer is from about 5 to about 95 weight % and the amount of the acrylic or vinyl resin is from about 95 to about 5 weight %. The emulsion polymerization can be performed according to standard methods: batch polymerization using the monomer dispersion from the beginning; semi-continuous polymerization, wherein part of the monomer mixture is fed continuously or in batches; and continuous polymerization wherein the monomer mixture is fed continuously or in batches in the aqueous polymer dispersion during the reaction.

The surfactant can be anionic, cationic, and/or non-ionic surfactants, and/or amphoteric surfactants. The surfactant can be used separately or in combination with two or more. Examples of the anionic surfactant include esters of higher alcohol sulfates (e.g., sodium salts of alkyl sulfonic acids, sodium salts of alkyl benzenesulfonic acids, sodium salts of succinic acids, sodium salts of succinic acid dialkyl ester sulfonic acids, sodium salts of alkyl diphenylether disulfonic acids). Examples of the cationic surfactant include an alkyl pyridinium chloride or an alkylammonium chloride. Examples of the non-ionic surfactant include polyoxyethylene alkylphenyl ethers, polyoxyethylene alkyl esters, polyoxyethylene alkyl esters, polyoxyethylene alkylphenyl esters, glycerol esters, sorbitan alkylesters, and derivatives thereof. Examples of the amphoteric surfactant include lauryl betaine. Reactive emulsifiers, which are able to copolymerize with the above-mentioned monomers, can also be used (e.g., sodium styrene sulfonate, sodium alkylsulfonate, sodium aryl alkylsulfonate and the like). The amount of surfactant usually used is from about 0.05 to about 5 parts by weight per 100 parts by weight of total polymer particles, though other amounts can be used.

Any kind of initiator which produces radicals suitable for free radical polymerization in aqueous media, preferably for temperatures from about 20 to about 100° C., can be used as the polymerization initiator. They can be used alone or in combination with a reducing agent (e.g., sodium hydrogenobisulfite, sodium thiosulfate, sodium hydrogenosulfite). For example, persulfates and hydrogen peroxide can be used as water-soluble initiators, and cumene hydroperoxide, diisopropyl peroxy carbonate, benzoyl peroxide, 2,2'-azobis methylbutanenitrile, 2,2'-azobisisobutyronitrile, 1,1'-azobiscyclohexane-1-carbonitrile, isopropylbenzenehydroperoxide can be used as oil-soluble initiators. Preferred initiators include 2,2'-azobis methylbutanenitrile and 1,1'-azobiscyclohexane-1-carbonitrile. The oil-soluble initiator is preferably dissolved in the monomer mixture or in a small quantity of solvent. The amount of initiator used is preferably from about 0.1 to about 2 parts by weight per 100 parts by weight of the monomer mixture added.

Any suitable type of chain transfer agents can be used, and preferably one that does not considerably slow down the reaction. The chain transfer agents that can be used include, for example, mercaptans (e.g., dodecyl mercaptan, octylmercaptan), halogenated hydrocarbon (e.g., carbon tetrachloride, chloroform), xanthogen (e.g., dimethylxanthogen disulfide), and the like. The quantity of chain transfer agent used is usually from about 0 to about 5 parts by weight per 100 parts by weight of the monomer mixture added.

Any suitable type of pH adjusting agents can be used. The pH adjusting agents that can be used include, for example, sodium carbonate, potassium carbonate, and sodium hydrogenocarbonate, and the like. The quantity of pH adjusting agent used is usually from about 0 to about 2 parts by weight per 100 parts by weight of the monomer mixture added.

A small quantity of solvent can be added during the reaction, for instance, in order to help the seed particle swelling (if this is used) by the monomer (and therefore, increase the mixing at a molecular level) and improve film formation. The quantity of solvent added should be in such ranges that workability, environmental safety, production safety, and/or fire hazard prevention are not impaired. The solvents used include for example, acetone, methylethyl ketone, N-methyl pyrrolidone, toluene, dimethylsulfoxide, and the like.

One advantage of the present invention is the introduction of at least one ionic or ionizable moiety, such as a sulfonated moiety, to the polymer by copolymerization of a monomer containing the ionic or ionizable group, optionally with other monomers, in the presence of a polymer aqueous dispersion. Consequently, in the present invention, the ionic or ionizable functionality is chemically bonded to the polymer chain via polymerization thus avoiding grafting techniques.

In addition, the present invention optionally permits an intimate blending of two or more polymers in the dispersion (e.g., aqueous dispersion), preferably through the use of the seeded polymerization method or methods. Accordingly, the resulting resin can be an intimate blend of at least one polymer and at least one polymer bearing the ionic or ionizable group. Thus, the need for grafting techniques can be avoided as well as the need to use environmentally unfriendly solvent solutions. Moreover, there is no need for post-sulfonation of the resin using acids such as sulfuric and sulfonic acids or derivatives thereof, since the ionic or ionizable group, e.g., the sulfonated group, is already on the monomer. Furthermore, because the ionic or ionizable group is preferably polymerized, its distribution along the polymer chain is easily controlled by conventional means known in the art such as shot addition, continuous feed, late addition, and the like. Consequently, the resulting ionic or ionizable group distribution in a membrane formed from the polymer blend can be more easily controlled than previously. Accordingly, the tailoring of various properties, such as homogeneous, random, heterogeneous, and the like, can be achieved.

Prior to the present invention, it was believed that polymer blends containing at least one acrylic resin or vinyl resin having at least one ionic or ionizable group which had domain sizes of above 1,000 nm, when formed into a polyelectrolyte membrane layer, did not lead to good conductivity. Thus, smaller domain sizes were generally favored and developed by the present inventors. In the present invention, however, with the use of multi-layer polyelectrolyte membranes, it was discovered that the domain size of the acrylic resin or vinyl resin can be large or small and present in one or more layers. The further development of the multi-layer polyelectrolyte membrane of the present invention overcomes this previously thought problem. With the present invention, any domain size for the acrylic resin or vinyl resin can be used in one or more layers that form the multi-layer polyelectrolyte membrane. Generally, when the polymer blend containing the at least one acrylic resin or vinyl resin having at least one ionic or ionizable group is blended with at least one polymer, such as a thermoplastic fluoropolymer, domain sizes of about 1,000 nm or higher are obtained. In the present invention, the domain sizes of the acrylic resin or vinyl resin in the additional polymer can be such that the domain sizes are less than 1,000 nm, such as 700 nm to 1000 nm, 500 nm or less and in many cases significantly below 100 nm to the point where the domains are barely detectable, if detectable at all, such as shown in FIG. 2.

One way to achieve smaller domain sizes is to form the acrylic resin or vinyl resin having the at least one ionic or ionizable group as described above and to then treat this acrylic resin or vinyl resin in order to have an ammonium counterion and/or phosphonium counterion associated with the ionic or ionizable groups. In many embodiments, the ionic or ionizable group that is present with respect to the acrylic resin or vinyl resin is in the form of an acid or salt. In order to achieve a type of ion exchange, the acid form is neutralized to form a salt. This is achieved by adding an ammonium compound (e.g., that will generate an ammonium ion) or phosphonium compound (e.g., that will generate a phosphonium ion) such as the ones described in detail below. The amount of the ammonium compound or phosphonium compound can be any amount sufficient to achieve the desired level of ionic exchange or salt formation. For instance, the ammonium or phosphonium compound can be added to neutralize from about 40% or less to about 100% and more preferably from 70% to about 95% by wt. of the ionic or ionizable groups. The ammonium or phosphonium compound can be added in any fashion such as simply mixing in the ammonium or phosphonium compound with the acrylic resin or vinyl resin. The ammonium or phosphonium compound can be in any form, and is preferably in the form of a solid or liquid and more preferably a liquid. The ionic exchange or treatment can occur prior to, during, and/or after blending with the additional polymer. Once the ammonium or phosphonium compound has been added and the salt has formed and after film or membrane formation, the salt can then be converted back to its original state, which as stated above, in most instances is an acid form. This can be achieved by introducing an acid, which is preferably a strong acid, such as sulfuric acid, to the polymer blend which will then cause the reformation of the acid (e.g., protonated). An alkali metal, alkaline earth metal hydroxide, an aqueous solution, diluted $H_2SO_4$, diluted HCl, and the like can be used instead of a strong acid. The reformation can be done to completely remove or substantially remove (e.g., 95% by wt. or higher removal) the ammonium or phosphonium salt or can be partially removed to any degree desired. The film or membrane can then be washed using various techniques to remove the ammonium and/or phosphonium compound as well as any acid residue. This can simply be done by using water such as deionized water and the like. The film or membrane can be cross-linked before or after the ammonium or phosphonium compound (e.g., salt) has been removed. The film or membrane is preferably cross-linked using any conventional cross-linking technique, such as those exemplified above. This cross-linking may aid in ensuring that the acrylic resin or vinyl resin is locked into place with respect to the polymer blend. This permits improved conductivity and ensures that the phase compatability between the polymers is maintained, especially over time. The removal of the ammonium and/or phosphonium counterion preferably occurs after formation of the film or membrane. In lieu of these counterions, any counterions that permit the same effect can be used. The present invention permits a more uniform dispersion of the polymer blend and provides greatly improved conductivity and greatly improved smaller domain sizes as described above. In the art, domain sizes are also sometimes referred to as clusters or ionic clusters.

With respect to the ammonium compound, the ammonium compound preferably, as described above, forms a counterion to the ionic or ionizable group. This counterion is considered an ammonium counterion and more preferably an alkyl ammonium counterion and even more preferably an alkyl quaternary ammonium counterion. Preferably, the alkyl groups of the ammonium counterion are C1-C6 alkyl group though other alkyl ammoniums can be used. In addition, more than one different type of counterion can be formed such as two or more different types of ammonium counterions. The same is true for the phosphonium counterions. This can be accomplished by using two or more different ammonium and/or phosphonium materials to form different ions or a mixture of various ions.

As stated above, and strictly as an example, the sulfonated or phosphonated resins in either acid or salt form can be mixed with the ammonium compound (e.g., salt), such as an organic quaternary ammonium compound to thereby convert the resin to an ammonium salt. This step can be repeated several times to achieve satisfactory conversion of the resin to the ammonium salt. Examples of suitable ammonium salts include: tetramethylammmonium, tetraethylammonium, tetrapropylammonium, tetrabutylammonium, tetrapentylammonium, tetrahexylammonium, benzyltrimethylammonium, benzyltriethylammonium, hexamethonium, decamethonium, cetyltrimethylammonium, decyltrimethylammonium, dodecyltrimethylammonium, and methyltributylammonium. Preferably the ammonium salt has a molecular weight of at least 186. Mixtures of the ammonium salts can be utilized in the process. The ammonium can contain organic groups in a quaternary ammonium salt of the formula N R1R2R3R4+, wherein R1-R4 are independently selected from C1-C30 alkyl, aryl, aralkyl or cycloalkyl groups. The phosphonium analogs of the ammonium salts can also be used, such as tetraalkyl phosphonium salts and like.

As stated, the ammonium or phosphonium salt containing resin can be processed using conventional methods to prepare a film or polymer membrane. The film or polymer membrane can then preferably be processed to remove all or most of the ammonium and/or phosphonium cation and convert the film or membrane back to its original form (e.g., acid or salt form). This step can be achieved by exposing the film or polymer membrane to a solution of an alkaline metal or alkaline earth metal hydroxide or an aqueous acid solution, such as sulfuric acid or hydrochloric acid. In some cases this step can be repeated to achieve satisfactory conversion of the ammonium or phosphonium salt back to the acid or salt form or other desirable form.

Furthermore, due to these various advantages described above, the applications of the present invention can include, but are not limited to, films, membranes, fuel cells, coatings, ion exchange resins, oil recovery, biological membranes, batteries, and the like.

A multi-layer polymeric ion membrane or polyelectrolyte membrane can be made from the polymers of the present invention. The polymeric ion membrane can be prepared from conventional film preparation methods, such as melt extrusion, solvent cast, latex cast, and the like. Membrane electrode assemblies can be made from the membranes of the present invention and fuel cells using this membrane electrode assembly can be prepared. In using the polymers of the present invention to form membranes, the polymer can have any equivalent weight and preferably has an equivalent weight of from about 200 to about 8,000, and preferably from about 200 to about 1,500 and even more preferably from about 200 to about 1,400, with respect to the ionic acrylic or vinyl resin present in the polymer.

In more detail, the compositions of the present invention are especially useful in fuel cells, batteries, and the like. The design and components used in the fuel cell and batteries would be the same as in conventional fuel cells and batteries except using the compositions of the present invention in the formation of the multi-layer polymeric ionic exchange membrane. Accordingly, the designs and manners of making the fuel cells and batteries as described in U.S. Pat. No. 5,795, 668, EP 1 202 365 A1, PCT Publication No. WO 98/22989, WO 02/075835, and WO 98/20573, Lin et al., Journal of Applied Polymer Science, Vol. 70, 121-127 (1998) can be used in the present invention and are fully incorporated herein in their entireties by reference. The membrane can be used alone or with conventional fillers, such as silica and the like. The fuel cell may use a liquid or gaseous fuel such as a liquid hydrocarbon like methanol. The fuel cell of the present invention is capable of operating at a wide range of operating conditions. The fuel cell of the present invention can have a porous support layer and an ion exchange resin wherein the ion exchange resin is supported on at least one side of the porous support layer. The present invention can be useful in direct methanol fuel cells or other fuel cells. Preferably, the fuel cells of the present invention have low fuel crossover, high electric conductivity, and/or high mechanical strength. The overall thickness of the combined layers that form the membrane can be conventional but is preferably from about 0.5 to about 10 mils and more preferably from about 1 mil to about 5 mils. Further, the membrane preferably has an equivalent weight of from about 200 to about 2500, and more preferably about 200 to about 1400. The porous support layer can be made from any conventional material such as a fluoro-containing polymer or other hydrocarbon containing polymers such as polyolefin. The porous support layer has conventional parameters with respect to pore diameter, porosity, and thickness. The fuel cells of the present invention preferably have excellent electrical properties and relatively low electrical resistance.

Certain perfluorinated polymeric ion exchange membranes, are well known in the field for providing high cation transport, and have been extensively used as ion exchange membranes. Polymeric ion exchange membranes are referred to as solid polymer electrolytes or polymer exchange membrane (PEM).

The most commonly used membrane, and commercially available, are Nafion® and Aciplex®. They are perfluorinated sulfonated ionomers, commonly referred to as PFSI. The PEM which are based on the PFSI membrane generally suffer from the following short comings.
  i) Poor mechanical properties leading to failure and cracking.
  ii) Limited temperature window in which the cell can be operated, which leads to problems of water management, CO poisoning, and the like.
  iii) High cost.
  iv) Limited range of EW allowed.
  v) Lack of possibility to crosslink.

Because in PFSI, the ionomer and the polymer matrix (PTFE) are copolymerized, there is a limited range of EW and mechanical properties achievable since a change in ionomer amount will directly affect the polymer matrix and vice versa. By blending the ionomer with the polymer matrix, there is a greater possibility to achieve a wide range of EW independently of the polymer matrix. It is then possible to obtain a membrane with low EW while maintaining good mechanical properties.

When used for fuel cell or battery applications, the membrane sits in a very acidic medium at temperatures that could reach 150° C., and in presence electrochemical environment, solvents and the like, thus requiring high chemical and electrochemical resistance. Those requirements are often met when a perfluorinated membrane is used because perfluorinated materials have inherent chemical and electrochemical resistance. However, there are very few non-perfluorinated polymer electrolyte membranes described in the literature that meet these requirements.

For applications where the fuel is a liquid fuel, the barrier properties of the membrane toward that fuel are critical. For example, in direct methanol fuel cell, the fuel can be a dilute (1M to 4 M) methanol aqueous solution. Very few membranes can meet the needed barrier properties.

The membrane's mechanical strength is an important property for battery, chlor-alkali cell, and fuel cell applications. Indeed the membrane is often subject to high differential pressures. In addition, the mechanical strength becomes critical when the membrane is very thin (less than 100 microns). However, the commercially available PFSI membranes show limited mechanical properties and often fail or crack during cell operation leading to irreversible damage. There are many ways to overcome this problem. By blending the ionomer in a polymer matrix that has good mechanical strength, it is possible to prepare a membrane with high proton conductivity and good overall mechanical properties.

In order to enhance the mechanical and chemical properties of a polymer, an easy and efficient route is to crosslink. However, in PFSI this is very difficult to achieve since fluorinated monomers and perfluorinated ionomers do not readily copolymerize with non perfluorinated functional monomers. And there are no or very few perfluorinated functional monomers commercially available. In the present invention, the polymer blend allows for copolymerizing a functional monomer with the ionomer, or adding a crosslinkable polymer or monomer to the blend. This leads to an easy way of crosslinking if required.

Most of the membranes for DMFC application described in the literature face the problem of trade off between low areal resistance and low methanol crossover. Most of them display high areal resistance when methanol crossover is low, and vice versa. For example, addition of additives such as fillers or PTFE fibrils into a Nafion type membrane helps indeed to lower the methanol crossover, but leads to an increase of the areal resistance because the additive is not proton conductive. Ideally, one would like low areal resistance (highest proton transport) and low methanol crossover. This is illustrated in the following Tables based on open literature data. As can be seen, although a significant decrease in methanol crossover is achieved, it comes with a trade off of lower conductivity. In order to allow for comparison with the present invention, the areal resistance has calculated based on data from the reference paper.

TABLE 1

Properties of partially sulfonated poly(styrene) membranes, from N. Carretta, V. Tricoli, F. Picchioni, J. Memb. Sci., 166 (2000) 189.

| Membrane | IEC eq/g | Wet thick. μm | σ 22° C. mS/cm | D @ 22° C. $10^{-6}$ cm²/s |
|---|---|---|---|---|
| Nafion 117 | 0.90 | 216 | 75.9 | 1.30 |
| SPS 15 | 1.24 | 105 | 1.5 | 0.027 |
| SPS 18 | 1.34 | 233 | 32 | 0.52 |
| SPS 20 | 1.41 | 338 | 50 | 0.52 |

* obtained from V. Tricoli, J. Electrochem. Soc., 145 (1998) 3798.

| Membrane | IEC Meq/g | Wet thick. μm | σ 22° C. mS/cm | R 22° C.[b] Ω/cm² | D 22° C. $10^{-6}$ cm²/s | $J^b$ $10^{-16}$ mol/cm²/s |
|---|---|---|---|---|---|---|
| Nafion 117[a] | 0.90 | 216 | 75.9 | 0.28 | 1.30 | 6.02 |
| SPS 15 | 1.24 | 105 | 1.5 | 7.00 | 0.027 | 0.26 |
| SPS 18 | 1.34 | 233 | 32 | 0.61 | 0.52 | 2.65 |
| SPS 20 | 1.41 | 338 | 50 | 0.68 | 0.52 | 1.54 |

[a]V. Tricoli, J. Electrochem. Soc., 145 (1998) 3798.
[b]Calculated from the values given by Carretta et al.

TABLE 2

Properties of partially sulfonated polystyrene-block-poly(ethylene-ran-butylene)-block-polystyrene membranes, from J. Kim, B. Kim, B. Jung, J. Memb. Sci., 166 (2000) 189.

| Membrane | Wet thick. μm | σ mS/cm | D $10^{-6}$ cm$^2$/s |
|---|---|---|---|
| Nafion 117 | ~220 | 30 | 2.60 |
| 15% SSEBS | 313 | 1.3 | 0.021 |
| 22% SSEBS | 287 | 18 | 0.65 |
| 34% SSEBS | 274 | 32 | 0.12 |
| 47% SSEBS | 342 | 45 | 0.26 |

| Membrane | Wet thick. μm | σ mS/cm | R* Ω/cm$^2$ | D $10^{-6}$ cm$^2$/s | J* $10^{-16}$ mol/cm$^2$/s |
|---|---|---|---|---|---|
| Nafion 117 | ~220 | 30 | 0.73 | 2.60 | 11.8 |
| 15% SSEBS | 313 | 1.3 | 24 | 0.021 | 0.07 |
| 22% SSEBS | 287 | 18 | 1.59 | 0.65 | 2.26 |
| 34% SSEBS | 274 | 32 | 0.86 | 0.12 | 4.38 |
| 47% SSEBS | 342 | 45 | 0.76 | 0.26 | 7.60 |

*Calculated from the values given by Kim et al.

Finally, another barrier is the limitation in cell temperature. This is essentially due to the inherent chemical structure of the polymer, which is based on copolymerization of TFE and a perfluorinated sulfonated monomer. And it is well known that PTFE does not have good mechanical resistance at high temperatures. Because the commercially available PFSI loose between 65-80 C. This leads to very difficult water management problems. In order to have a fuel cell that does not require expensive and cumbersome equipment to manage water flows, a membrane that can withstand higher temperatures is required.

In order to overcome the limits mentioned above, and develop a membrane that could be used for application in fuel cells, synthesis of a novel polymer polyelectrolyte membrane became the focus. In one embodiment, a novel polymer electrolyte membrane was developed in which:

a) The ionomer (polyelectrolyte) is not perfluorinated.
b) The PEM is a blend between a polymer and an ionomer.
c) By properly choosing the pair polymer/ionomer, superior mechanical properties can be achieved. The resulting polyelectrolyte membrane has high mechanical strength.
d) By properly dispersing the ionomer in the polymer matrix, it is possible to achieve superior properties.
e) By properly selecting the nature and amount of counter ion used in the membrane preparation superior properties are obtained.
f) By making a multi-layer membrane, the selectivity to alcohols can be enhanced, in particular methanol selectivity, while maintaining all other key properties.
g) Unlike most membranes described in the literature, the present membrane can display a low methanol crossover and/or a low areal resistance. This is achieved by using the polyelectrolytes of the present invention in one or more layers of a multi-layer membrane.

By properly selecting the non-perfluorinated ionomer resin, the fluoropolymer matrix, or the nature of the counter ion used in the membrane preparation, one preferably can obtain a multi-layer membrane which overcomes one or more of the PFSI shortcomings.

By the present invention, one can have a direct control of the ionic (e.g., sulfonated) group location (unlike sulfonation by grafting techniques) and the present invention can use commercially available monomers, thus avoiding very complex steps to prepare "sulfoned perfluorinated ionomers". The resulting process is also very simple as opposed to processes used to prepared perfluorinated sulfonated ionomers such as Nafion® or Aciplex®.

In one embodiment, the polyelectrolyte membrane is formed from a composition that contains at least one acrylic and/or vinyl resin or both having at least one ionic or ionizable group. Preferably, at least one ammonium counterion and/or phosphonium counterion is also present with the at least one ionic or ionizable group. Furthermore, at least one additional polymer is also present. The domain size of the acrylic and/or vinyl resin, or both, having at least one ionic or ionizable group can be any size (e.g., above 700 nm, above 500 nm, or about 500 nm or less). Any of the domain sizes mentioned above can be used. Preferably, the at least one ionic or ionizable group is present in an amount of from about 200 to about 2,500 EW. As stated above, the counterion is removed (e.g., converted back to acid form). In one embodiment, the polyelectrolyte membrane is quite useful with fuel cells including fuel cells powered by direct fuel such as direct methanol fuel cells or polymer electrolyte fuel cells. The present invention is especially useful for gas or liquid fuel cells, such as methanol. The present invention can provide an improved reduced fuel crossover such as reduced methanol crossover. In addition, or alternatively, the present invention further provides a membrane that has a reduced areal resistance. Furthermore, the thickness of the membrane can be significantly reduced by way of the present invention and yet achieve reduced fuel crossover and/or reduced areal resistance.

As stated, in the present invention, the membrane has multiple layers. Each layer can be the same or different from the other layers. By using a multi-layer membrane, one can achieve varying degrees of fuel (e.g., methanol) selectivity and proton conductivity. Each layer can have the same or different chemical composition, thickness, or be formed with different amounts and types of an ammonium and/or phosphonium counterion. By using a multi-layer membrane construction, reduced fuel crossover can even be more improved.

The multi-layer membrane of the present invention can be prepared any number of ways. Each individual layer can first be prepared as described above using conventional casting or other layer forming techniques. These layers can then be combined to form a multi-layer membrane structure. The layers can be adhered together or attached together by other means commonly used to form laminate structures. In addition, one layer can be formed and then a second layer can be casted onto the previously layer to form the second layer and so on to form the desired number of layers. The multi-layer structure of the present invention can have two layers, three layers, four layers or more. Each layer of the multi-layer polyelectrolyte membrane can be formed in the same manner or by different manners. Thus, each layer of the multi-layer polyelectrolyte membrane can be formed by extrusion, solvent cast, latex cast, or other film preparation techniques. One layer can be extruded, for instance, and another layer can be casted as so on. Also, any lamination technique of combining polymeric layers can be used to form each layer. Accordingly, any combination of formation of layers can be used in the present invention to form the multi-layer structure.

The multi-layer polyelectrolyte membrane of the present invention can have one or more layers which contain the polyelectrolyte of the present invention. Also, an option, one or more layers of this multi-layer membrane can contain other polyelectrolytes that are commercially available such as Nafion®, Flemion® and Aciplex® polymers or other perfluorinated sulfonated materials. For purposes of the present invention, at least one of the layers contains the polyelectrolyte of the present invention.

With respect to the various layers on the multi-layer polyelectrolyte membrane of the present invention, one, or more than one, or all of the layers can contain at least one acrylic and/or vinyl resin or both having at least one ionic or ionizable group and at least one additional polymer, wherein the polyelectrolyte used in each layer can be the same or different. Furthermore, the domain sizes of the at least one acrylic and/or vinyl resin present in the electrolyte that forms one or more layers can be the same or different from layer to layer. In other words, one layer that contains the polyelectrolyte that has at least one acrylic and/or vinyl resin can have a small domain size (e.g., 500 nm or less) and another layer that forms part of the same multi-layer membrane can have at least one acrylic and/or vinyl resin having a large domain size, for instance, about 700 nm or more. Also, other layers that contain at least one acrylic and/or vinyl resin can have all large domain sizes such as on the order of 1,000 nm or more. Thus, any combination of layers can be used where some or all of the layers contain at least one acrylic and/or vinyl resin having at least one ionic or ionizable group and the domain sizes of the acrylic and/or vinyl resin can be the same or different from layer to layer. One or more layers can have both small and large domain sizes. In addition, a layer that contains a polyelectrolyte that is not an acrylic and/or vinyl resin having at least one ionic or ionizable group can be used such as a layer containing a perfluorinated sulfonated polymer such as Nafion®. Thus, any combination is possible as long as one of the layers contain a polyelectrolyte containing at least one acrylic and/or vinyl resin having at least one ionic or ionizable group with any domain size and at least one additional polymer. Also, as stated, the thickness for each layer can be the same or different and generally, the overall thickness is about 10 mil or less. Though thicknesses above 10 mil are certainly within the scope of the present application.

Furthermore, with the use of multi-layer polyelectrolyte membranes, it was discovered that when the total thickness of the multi-layer membrane is compared to a single layer membrane having the same overall thickness, the use of multi-layer membranes provided an improvement with respect to conductivity and a lowering of areal resistance. This was even true when the domain size of the acrylic and/or vinyl resin having the at least one ionic or ionizable group was above 500 nm. Accordingly, the use of multi-layer polyelectrolyte membranes provides an unexpected advantage and permits the use of any domain size with respect to the acrylic and/or vinyl resin.

Preferably, the polyelectrolyte membranes of the present invention achieve a methanol crossover, when used in a fuel cell, of $5\times10^{-16}$ mol/cm$^2$/s or lower and more preferably $3\times10^{-16}$ mol/cm$^2$/s or lower, and even more preferably $1\times10^{-16}$ mol/cm$^2$/s or lower. Suitable ranges can include from about $0.01\times10^{-16}$ cm$^2$/s to about $3\times10^{-16}$ mol/cm$^2$/s. Other ranges are possible. In addition, or in the alternative, the polyelectrolyte membranes of the present invention when used in a fuel cell can have an areal resistance of about 0.3 Ω/cm$^2$ or less and preferably about 0.1 Ω/cm$^2$ or lower. Suitable ranges include from about 0.1 to about 0.3 Ω/cm$^2$. The multi-layer membranes preferably have a wet thickness of from 0.5 mil to 1.75 mil for these various ranges regarding methanol crossover and/or areal resistance. These thicknesses are typically for wet thickness since areal resistance is measured based on wet thickness. However, the thickness of the membrane can be the above ranges and the following ranges whether it is for wet thickness or dry thickness. Other ranges include, but are not limited to, 0.5 mil to 1.75 mil or more; 0.75 mil to 1.75 mil; 1 mil to 1.75 mil; 1 mil to 1.5 mil; 0.5 mil to 1.5 mil, or other thicknesses above or below these ranges. In another embodiment of the present invention, the present invention relates to a polyelectrolyte membrane, which is preferably a multi-layer polyelectrolyte membrane, having a total membrane thickness of 1.75 mil or less and having an areal resistance of 0.3 Ω/cm$^2$ or less. The areal resistance can be from about 0.1 Ω/cm$^2$ to about 0.3 Ω/cm$^2$. Preferably, the thickness is from 0.5 mil to 1.75 mil; 0.75 mil to 1.75 mil; 1 mil to 1.75 mil; 1 mil to 1.5 mil; or 0.5 mil to 1.5 mil. These thicknesses are based on wet thickness and can also be based on dry thickness. The methanol cross-over range set forth above in this same paragraph can be also a characteristic of these membranes.

As stated above, fuel cells, batteries, and the like can be used and incorporate the polyelectrolyte compositions of the present invention in the form of a membrane or other shape.

In all the tables, the quantities of monomer and seed particles are given in weight percent, unless otherwise specified.

Proton Conductivity Measurements:

Proton conductivity was measured in a 4 probes configuration using a Gamry Instruments that posses a PC4 750 potentiostat an a EIS 300 system to run Electrochemical Impedance Spectroscopy. Measurements are performed (after boiling the membrane in water for 1 hour) under liquid water at different temperatures. By using the resistance R determined by the EIS measurement, the conductivity a is calculated using the formula below:

$$\sigma = \frac{d}{w \times t \times R}$$

where w: width of the film, d: distance between the inner electrodes, R: Resistance of the film.

Areal resistance: The areal resistance gives an indication of conductivity per unit of thickness, hence taking into account the membrane resistance. The areal resistance is given in Ωcm$^2$. The area Resistance $R_a$ is expressed as a function of the proton conductivity σ and the thickness t as:

$$R_a = \frac{t}{\sigma}.$$

Note that this area resistance is different from the surface resistance R typically used in microelectronics or glass coating industry and expressed in Ω/square cm as:

$$R_S = \frac{1}{t \times \sigma}.$$

Methanol/Ethanol Permeation Measurement:

The methanol concentration is monitored continuously using a differential refractometer Waters 410. The flow rate used was 2 mL/min. The methanol aqueous concentration used was generally 1 mol/L.

Permeability Coefficient D:

A membrane diaphragm cell (E. L. Cussler, Diffusion, 2$^{nd}$ ed., Cambridge University Press, Cambridge, 1997) was used to measure methanol diffusion coefficient. The membrane methanol diffusion coefficient D is expressed as:

$$D = \frac{1}{\beta \times t} \times \ln\left(\frac{C_0^B - C_0^A}{C_t^B - C_t^A}\right) \quad (I)$$

Where $\beta$ (cm$^{-2}$): diaphragm-cell constant, $$\beta = \frac{A}{l} \times \left(\frac{1}{V^A} - \frac{1}{V^B}\right),$$

t, time (s), $C_0^A$ and $C_0^B$: initial methanol concentrations in both compartments (mol/L), $C_t^A$ and $C_t^B$: methanol concentrations in both compartments at t (mol/L), $V^A$ and $V^B$: volumes of the two cell compartments (cm$^3$).

Methanol Flux:

The flux J of methanol across the membrane is defined by:

$$J = \frac{D}{l} \times (C_0 - C)$$

where D: methanol diffusion coefficient of the membrane, l: membrane thickness and ($C_0$-C): concentration gradient through the membrane.

Selectivity:

In the DMFC field, membrane selectivity $\alpha$ is a key criterion used to qualify a membrane. This selectivity is define as:

$$\alpha = \frac{\sigma}{D}$$

where $\sigma$: membrane conductivity and D: methanol diffusion coefficient.

The present invention will be further clarified by the following examples which are intended to be purely exemplary of the present invention.

EXAMPLES

The compositions of the present invention were made using the following materials and reaction conditions:

The synthesis of the ionomer is described in and PCT Publication No. WO 01/60872, the entire disclosure of which is incorporated herein by reference.

The films were cast on glass substrates using a blade type applicator and cured in an oven at temperatures ranging from 150° C. to 200° C., for 1 to 15 minutes.

Raw Materials

Monomers (ATOFINA Chemicals, Inc., Aldrich), initiators (Aldrich, DuPont), surfactants (Aldrich) and buffers (Aldrich) were used without further purification.

Desmodur BL-3175A is a hexamethylene diisocyanate oligomer blocked with methyl ethyl ketoxime, and is a product of Bayer Corp.

Example 1

An ionomer solution in NMP (25% by weight) of SEM/HEMA/MMA/Styrene (10.8 g) (EW=278), 2.75 g of a 55% water solution of TBAOH (available from Sachem) and 40.31 g of NMP were added with mixing to a reactor vessel equipped with appropriate inlets and equipment. To 20.16 g of this solution, 2.36 g of Kynar 2801 (ATOFINA Chemicals) powder were added while stirring at 60° C. until dissolution. Once a homogeneous solution was obtained, 0.52 g of Desmodur BL3175A isocyanate cross-linker (Bayer) and 0.02 g of DBTDL catalyst are added with mixing. The solution was poured on a glass plate, spread with a doctor knife and baked for 7 minutes at 177° C. The film membrane was protonated by treatments with one molar hydrochloric (HCl) and sulfuric (H2SO4) acids for 2 hours each at 65° C., then rinsed with deionized water. The proton conductivity of the membrane, measured by AC impedance, was 30 mS/cm and the areal resistance at 25° C. is 0.15 $\Omega$/cm$^2$.

Examples 2-7

Same preparation procedure as Example 1 above. Amounts of reactants and testing results presented in Tables 3, 4 and 5.

Example 8

A NMP solution of polyelectrolyte in TBA form was prepared as follows: to 6428 g of a 25 wt % solution of polyelectrolyte in NMP, 2204 g TBAOH (55% in water) were added and the water removed. Then 4445 g NMP were added. To 6051 g of this solution were added 1878 g Kynar 2801 and 7149 g of NMP and stirred until dissolution. To 41.05 g of the polyelectrolyte/Kynar solution in NMP described above, 0.39 g of Desmodur N3300 isocyanate cross-linker (Bayer) were added with mixing. The solution was poured on a glass plate, spread with a doctor knife and baked for 7 minutes at 177° C. The membrane was protonated by treatments with one molar hydrochloric (HCl) and sulfuric (H2SO4) acids for 2 hours each at 65° C., then rinsed with deionized water. The proton conductivity of the membrane, measured by AC impedance, was 60 mS/cm and the areal resistance at 25° C. is 0.06 $\Omega$/cm$^2$.

Example 9

Same as Example 8 above but without addition of an isocyanate crosslinker. The proton conductivity of the membrane, measured by AC impedance, was 60 mS/cm and the areal resistance at 25° C. is 0.06 $\Omega$/cm$^2$.

Example 10

Same preparation procedure as Example 8 above. Amounts of reactants and testing results presented in Tables 3, 4 and 5.

Comparative-Example 11

An ionomer solution in NMP (25% by weight) of SEM/HEMA/MMA/Styrene (5.62 g) (EW=278), 0.39 g of a 48% water solution of NaOH and 25.80 g of NMP were added to a reactor vessel with mixing. To this solution, 3.65 g of Kynar 2801 (ATOFINA Chemicals) powder was added while stirring at 60° C. until dissolution. Once a homogeneous solution was obtained, 0.80 g of Desmodur BL3175A isocyanate cross-linker (Bayer) and 0.04 g of DBTDL catalyst are added with mixing. The solution was poured on a glass plate, spread with a doctor knife and baked for 7 minutes at 177° C. The membrane was protonated by treatments with one molar hydrochloric (HCl) and sulfuric (H2SO4) acids for 2 hours each at 65° C., then rinsed with deionized water. The proton conductivity of the membrane, measured by AC impedance, was 6 mS/cm and the areal resistance at 25° C. is 0.53 $\Omega$/cm$^2$.

Example 12

Same preparation procedure as Example 1 above. Upon addition of crosslinker solution turned black and preparation was stopped. Amounts of reactants presented in Tables 3 and 4.

Comparative-Example 13

Same preparation procedure as Example 1 above, but no organic quaternary ammonium salt was added. Amounts of reactants and testing results presented in Tables 3, 4 and 5.

TABLE 3

Preparation of polyelectrolyte solutions

| Example # | Polyelectrolyte Solution concentration (wt %) | Amount added (g) | Counterion Cation M+ | Solution concentration (wt %) | Amount added (g) | Solvent NMP (g) |
|---|---|---|---|---|---|---|
| 1 | 25 | 10.80 | TBAOH | 55 | 2.75 | 40.31 |
| 2 | 25 | 5.63 | TBAOH | 55 | 1.87 | 25.77 |
| 3 | 15 | 98.01 | TBAOH | 55 | 19.86 | 0 |
| 4 | 15 | 98.01 | TBAOH | 55 | 19.86 | 0 |
| 5 | 15 | 98.01 | TBAOH | 55 | 19.86 | 0 |
| 6 | 15 | 98.01 | TBAOH | 55 | 19.86 | 0 |
| 7 | 25 | 10.83 | TPAOH | 40 | 3.93 | 38.99 |
| 8 | 25 | 8.76 | TBAOH | 55 | 3.00 | 24.17 |
| 9 | 25 | 8.76 | TBAOH | 55 | 3.00 | 24.17 |
| 10 | 25 | 9.01 | TBAOH | 55 | 3.04 | 6 |
| 11 | 25 | 5.62 | NAOH | 48 | 0.39 | 25.80 |
| 12 | 25 | 5.62 | TBAOH | 55 | 2.66 | 25.67 |
| 13 | 25 | 6.30 | none | 0 | 0 | 4.21 |

TABLE 4

Preparation of polyelectrolyte/fluoropolymer blend solutions
a = powder, b = 15 wt % solution in NMP

| Ex. # | Polyelectrolyte Solution (g) | Kynar (g) | Form | Crosslinking Agent (g) | Catalyst (g) |
|---|---|---|---|---|---|
| 1 | 20.16 | 2.36 | a | 0.52 | 0.02 |
| 2 | 33.27 | 0.37 | a | 0.82 | 0.03 |
| 3 | 16.76 | 15.05 | b | 0.98 | 0.05 |
| 4 | 16.75 | 22.62 | b | 0.97 | 0.05 |
| 5 | 16.75 | 35.17 | b | 0.99 | 0.06 |
| 6 | 16.74 | 60.31 | b | 0.98 | 0.08 |
| 7 | 22.39 | 2.63 | a | 0.62 | 0.03 |
| 8 | 35.93 | 5.11 | a | 0.39 | none |
| 9 | 35.93 | 5.11 | a | none | none |
| 10 | 18.046 | 35 | b | 1.16 | 0.05 |
| 11 | 31.81 | 3.65 | a | 0.8 | 0.04 |
| 12 | 33.95 | 3.68 | a | Solution turned black | |
| 13 | 10.51 | 24.5 | b | 0.86 | 0.06 |

TABLE 5

Proton conductivity of polyelectrolyte membranes at 25° C.

| Example | Conductivity (mS/cm) | Areal resistance (ohm/cm$^2$) |
|---|---|---|
| 1 | 30 | 0.15 |
| 2 | 30 | 0.12 |
| 3 | 90 | 0.07 |
| 4 | 90 | 0.06 |
| 5 | 50 | 0.12 |
| 6 | 40 | 0.11 |
| 7 | 50 | 0.08 |
| 8 | 60 | 0.06 |
| 9 | 60 | 0.06 |
| 10 | 42 | 0.09 |
| 11 | 6 | 0.53 |
| 13 | 8 | 0.51 |

Experimental

Conductivity measurements were performed with a four probe configuration by Electrochemical Impedance Spectroscopy. The measurements were carried out between $5 \times 10^5$ and 1 Hz with a Gamry instrument (Potensiostat—Galvanostat ZRAPC4/750 and EIS 300 software). The values presented here have been obtained under immersed conditions at room temperature.

LEGEND

SEM Sulfoethyl methacrylate
Kynar 2801 PVDF copolymer
MMA methyl methacrylate
HEMA hydroxyethyl methacrylate
TBAOH tetrabutyl ammonium hydroxide
TPAOH tetrapropyl ammonium hydroxide
NaOH sodium hydroxide
NMP N-methylpyrrolidinone
DBTDL dibutyltin dilaurate

Example 14

The experimental procedure as described with respect to example 8 above was followed except for the chemistry and amounts as set forth in Table 6 below. Table 6 further provides conductivity measurements obtained in the same manner as above.

TABLE 6

| Neutralizing Agent | Neutralization (%) | Kynar Content (wt % of total polymer content) | Ratio of Crosslinking Functionalities | Conductivity (mS/cm) |
|---|---|---|---|---|
| TBAOH | 80 | 60 | 0.7 | 170 |
| TBAOH | 80 | 60 | 0.9 | 169 |
| TBAOH | 80 | 60 | 1.1 | 140 |
| TPAOH | 95 | 65 | 0.7 | 152 |
| TPAOH | 95 | 65 | 0.9 | 142 |
| TPAOH | 95 | 65 | 1.1 | 133 |

As can be seen from the above examples, the conductivity of the polyelectrolyte membranes of the present invention as shown in examples 1-10 and 14, for instance, are greatly higher than the conductivity set forth in examples 11 and 13 which are comparative examples. In addition, the resistance, as shown in Tables 3 and 4 was also greatly reduced using the techniques and polymers of the present invention.

Example 15

In the following examples, the crosslinking agent was Desmodur BL3175A isocyanate cross-linker from Bayer.

The catayst was dibutyltin dilaurate (DBTDL) catalyst from Atofina.

In formulation F1, the Kynar 2801 fluoropolymer was added in the form of powder.

Formulations F4 and F5 were prepared from solutions S4 and S5 which were exchanged with a blend of 2 counter ions: TPAOH and TMAOH Formulations F6 was prepared from solutions S6, which was exchanged with a blend of 2 counter ions: TBAOH and TPAOH Formulations F9 was prepared from solutions S9, which was exchanged with a blend of 2 counter ions: TPAOH and TEAOH Formulations F7 were prepared from solutions S7, which were neutralized with which was neutralized with the same level of TPAOH usually used but prepared with a higher fluoropolymer/polyelectrolyte ratio.

Formulations F15 to F18 were prepared from solutions S15 to S18 respectively, and were neutralized with the same level of TPAOH usually used but prepared with various fluoropolymer/polyelectrolyte ratios.

Table 7 sets forth the various ingredients and amounts. Unless stated otherwise, the same procedures as described above in previous examples were followed.

TABLE 7

Preparation of polyelectrolyte solutions
All polyelectrolytes P1, P2 and P3 were added as 25 wt % solution in NMP Polyelectrolyte P1, P2 and P3 are of similar composition but different batches.

| | Polyelectrolyte | | Counter ion | | | |
|---|---|---|---|---|---|---|
| Ex. # | Solution Concentration (wt %) | Amount added (g) | Cation M+ | Solution concentration (wt %) | Amount added (g) | Solvent NMP (g) |
| S1 | P1 | 6037 | TBAOH | 55% | 1083 | 12981 |
| S2 | P2 | 20.02 | TPAOH | 40% | 7.28 | 16.51 |
| S3 | P3 | 19.04 | TPAOH | 40% | 6.99 | 15.07 |
| S4 | P2 | 20.01 | TPAOH | 40% | 3.65 | 14.62 |
| | | | TMAOH | 25% | 2.62 | |
| S5 | P3 | 10.00 | TPAOH | 40% | 1.90 | 7.60 |
| | | | TMAOH | 25% | 1.32 | |
| S6 | P2 | 12.00 | TBAOH | 55% | 2.03 | 9.38 |
| | | | TPAOH | 40% | 2.18 | |
| S7 | P2 | 15.13 | TBAOH | 55% | 5.11 | 10.86 |
| S8 | P3 | 13.01 | TPAOH | 40% | 4.73 | 9.76 |
| S9 | P2 | 12.06 | TPAOH | 40% | 2.19 | 11.51 |
| | | | TEAOH | 25% | 3.23 | |
| S10 | P3 | 35.02 | TPAOH | 40% | 12.74 | 27.20 |
| S11 | P3 | 15.09 | TMAOH | 25% | 3.92 | 10.74 |
| S12 | P3 | 15.01 | TEAOH | 20% | 7.91 | 12.53 |
| S13 | P2 | 20.03 | TEAOH | 20% | 10.63 | 17.03 |
| S14 | P2 | 20.05 | TMAOH | 25% | 5.22 | 14.90 |
| S15 | P3 | 9.55 | TPAOH | 40% | 3.46 | 7.00 |
| S16 | P3 | 25.04 | TPAOH | 40% | 9.11 | 18.91 |
| S17 | P3 | 19.04 | TPAOH | 40% | 6.99 | 15.07 |
| S18 | P3 | 25.05 | TPAOH | 40% | 9.32 | 23.85 |

Table 8 sets forth the preparation of the polyelectrolyte using the solutions of Table 7

TABLE 8

Preparation of polyelectrolyte/fluoropolymer blend solutions
The fluoropolymer used in these examples was Kynar 2800 fluoropolymer. a = powder, b = 15 wt % solution in NMP

| | Polyelectrolyte | | fluoropolymer | | Crosslinking Agent | Catalyst |
|---|---|---|---|---|---|---|
| Ex. # | Solution | Weight (g) | (g) | Form | (g) | (g) |
| F1 | S1 | 16789 | 1874 | a | 342 | 16 |
| F2 | S2 | 37.61 | 77.8 | b | 2.18 | 0.15 |
| F3 | S3 | 34.8 | 73.92 | b | 2.14 | 0.12 |
| F4 | S4 | 35.5 | 77.81 | b | 2.48 | 0.13 |

TABLE 8-continued

Preparation of polyelectrolyte/fluoropolymer blend solutions
The fluoropolymer used in these examples was Kynar 2800
fluoropolymer. a = powder, b = 15 wt % solution in NMP

| Ex. # | Polyelectrolyte Solution | Weight (g) | fluoropolymer (g) | Form | Crosslinking Agent (g) | Catalyst (g) |
|---|---|---|---|---|---|---|
| F5  | S5  | 17.82 | 38.91  | b | 1.09 | .017 |
| F6  | S6  | 22.19 | 46.76  | b | 1.26 | 0.08 |
| F7  | S7  | 28.10 | 100.05 | b | 1.64 | 0.15 |
| F8  | S8  | 23.60 | 86.70  | b | 1.42 | 0.12 |
| F9  | S9  | 21.69 | 46.72  | b | 1.26 | 0.08 |
| F10 | S10 | 63.46 | 136.12 | b | 3.80 | 0.23 |
| F11 | S11 | 25.15 | 58.37  | b | 1.70 | 0.09 |
| F12 | S12 | 26.74 | 58.35  | b | 1.63 | 0.10 |
| F13 | S13 | 37.59 | 77.83  | b | 2.27 | 0.12 |
| F14 | S14 | 34.77 | 77.80  | b | 2.15 | 0.14 |
| F15 | S15 | 17.31 | 89.85  | b | 1.08 | 0.12 |
| F16 | S16 | 45.56 | 62.55  | b | 2.69 | 0.12 |
| F17 | S17 | 34.8  | 73.92  | b | 2.14 | 0.12 |
| F18 | S18 | 45.62 | 10.45  | b | 2.74 | 0.08 |

Table 9 sets forth the conditions for forming one or more layers of the membrane.

TABLE 9

Examples
Curing conditions for all membranes (or layers): 7 min at 177° C.,
Air Flow = 1800 rpm except for M1 and M2: 6 min at 127° C., Air Flow = 1300 rpm
Second and third layer were each applied on dry film (wet on dry technique).

| Ex. # | Film layer 1 Blend solution | Gap (μm) | Film layer 2 Blend solution | Gap (μm) | Film layer 3 Blend solution | Gap (μm) | Final Membrane Dry thickness |
|---|---|---|---|---|---|---|---|
| M1  | F1  | 330 | —   | —   | — | — | 50 |
| M2  | F1  | 660 | —   | —   | — | — | 25 |
| M3  | F2  | 400 | —   | —   | — | — | 26 |
| M4  | F3  | 400 | —   | —   | — | — | 26 |
| M5  | F4  | 400 | —   | —   | — | — | 42 |
| M6  | F5  | 400 | —   | —   | — | — | 40 |
| M7  | F6  | 400 | —   | —   | — | — | 29 |
| M8  | F7  | 400 | —   | —   | — | — | 31 |
| M9  | F8  | 400 | —   | —   | — | — | 27 |
| M10 | F9  | 400 | —   | —   | — | — | 23 |
| M11 | F10 | 500 | —   | —   | — | — | 44 |
| M12 | F10 | 300 | F11 | 110 | — | — | 25 |
| M13 | F2  | 200 | F13 | 400 | — | — | 41 |
| M14 | F2  | 200 | F2  | 250 | — | — | 25 |
| M15 | F10 | 300 | F12 | 180 | — | — | 30 |
| M16 | F2  | 200 | F13 | 250 | — | — | 30 |
| M17 | F2  | 200 | F14 | 250 | — | — | 26 |
| M18 | F10 | 300 | F12 | 110 | — | — | 26 |
| M19 | F10 | 300 | F11 | 180 | — | — | 38 |
| M20 | F15 | 200 | F16 | 250 | — | — | 31 |
| M21 | F17 | 100 | F18 | 220 | F17 | 150 | 42 |

Table 10 sets forth the properties of the membranes that were prepared.

TABLE 10

Membranes properties

|  | Film | Wet thick. μm | σ25° C. mS/cm | R 25° C. Ω/cm$^2$ | D $10^{-6}$ cm$^2$/s | J $10^{-16}$ mol/cm$^2$/s |
|---|---|---|---|---|---|---|
|  | Nafion 112 | 61  | 97 | 0.06 | 0.51  | 8.37 |
|  | Nafion 117 | 221 | 95 | 0.23 | 0.99  | 4.50 |
| Mono-layer | M1 | 61 | 61 | 0.10 | 0.36  | 5.90 |
|  | M2 | 28 | 62 | 0.04 | 0.23  | 8.38 |
|  | M3 | 35 | 27 | 0.12 | 0.10  | 2.77 |
|  | M4 | 37 | 42 | 0.08 | 0.17  | 4.59 |
|  | M5 | 72 | 28 | 0.19 | 0.001 | 0.01 |
|  | M6 | 99 | 29 | 0.3  | 0.002 | 0.02 |
|  | M7 | 40 | 38 | 0.11 | 0.14  | 3.45 |
|  | M8 | 31 | 35 | 0.09 | 0.11  | 3.48 |
|  | M9 | 31 | 12 | 0.26 | 0.03  | 1.01 |

TABLE 10-continued

Membranes properties

|  | Film | Wet thick. μm | σ25° C. mS/cm | R 25° C. Ω/cm$^2$ | D 10$^{-6}$ cm$^2$/s | J 10$^{-16}$ mol/cm$^2$/s |
|---|---|---|---|---|---|---|
|  | M10 | 36 | 21 | 0.19 | 0.12 | 3.51 |
|  | M11 | 63 | 36 | 0.13 | 0.21 | 3.41 |
| Bi-layer | M12 | 28 | 19 | 0.15 | 0.006 | 0.22 |
|  | M13 | 66 | 22 | 0.28 | 0.09 | 1.36 |
|  | M14 | 35 | 40 | 0.10 | 0.11 | 3.19 |
|  | M15 | 42 | 43 | 0.09 | 0.13 | 3.14 |
|  | M16 | 42 | 40 | 0.11 | 0.11 | 2.57 |
|  | M17 | 35 | 11 | 0.33 | 0.0007 | 0.02 |
|  | M18 | 34 | 33 | 0.10 | 0.09 | 2.56 |
|  | M19 | 42 | 40 | 0.09 | 0.005 | 0.10 |
|  | M20 | 40 | 44 | 0.09 | 0.04 | 0.97 |
| Tri-Layer | M21 | 68 | 72 | 0.10 | 0.47 | 6.40 |

As set forth in Table 10, the present invention made membranes which had excellent low areal resistance and/or low crossover. By taking into account the properties provided by the present invention, one can obtain a balance of properties with respect to thickness, areal resistance, and methanol crossover. When many of the embodiments of the present invention are compared to various membranes formed from commercially available Nafion, one can see that the methanol crossover was quite lower for many embodiments of the present invention compared to the membranes formed from Nafion and provided comparable areal resistance. This is all the more impressive considering that the embodiments of the present invention are generally non-perfluoronated polymers.

Examples 16-20

Formulation D1 (70% Kynar, no TAAOH) 27.0 g of a polyelectrolyte solution in NMP (15% by weight) and 63.0 g of a 15% solution of Kynar® 2801 PVDF (ATOFINA Chemicals) in NMP were mixed in a round bottom flask. Once a homogeneous solution was obtained, 1.7591 g of Desmodur® BL3175A isocyanate cross-linker (Bayer) and 0.0899 g of FASCAT® 4202 Catalyst (ATOFINA Chemicals) were added with mixing.

Formulation D2 (70% Kynar, 80% TBPOH) 54.0 g of a 15 wt % polyelectrolyte solution in N-methylpyrrolidinone (NMP) and 16.0 g of a 40% water solution of tetrabutylphosphonium hydroxide (TBPOH) (available from Sachem) were mixed in a round bottom flask. Water was removed by rotary evaporation at 70° C. and 4.60 g of NMP was added. To 35.1 g of this solution, 73.0 g of a 15% solution of Kynar® 2801 PVDF (ATOFINA Chemicals) in NMP, 2.0 g of Desmodur® BL3175A isocyanate cross-linker (Bayer) and 0.11 g of FASCAT® 4202 Catalyst (ATOFINA Chemicals) were added.

Formulation D3 (80% Kynar, 80% neutralization with TBAOH) 188.6 g of a 15 wt % polyelectrolyte solution in N-methylpyrrolidinone (NMP) and 38.10 g of a 55% water solution of tetrabutylammonium hydroxide (TBAOH) were mixed in a round bottom flask. Water was removed by rotary evaporation and 6.16 g N-methylpyrrolidinone added afterwards. To 10.0 g of this solution, 36.0 g of a 15% solution of Kynar® 2801 PVDF (ATOFINA Chemicals) in NMP and 0.32 g of Desmodur® N3300 isocyanate cross-linker (Bayer) were added.

Formulation D4 (no TBAOH) 12.0 g of a 15 wt % polyelectrolyte solution in N-methylpyrrolidinone (NMP) and 48.0 g of a 15.0% solution of Kynar® 2801 PVDF (ATOFINA Chemicals) in NMP were mixed in a round bottom flask. Once a homogeneous solution was obtained, 0.43 g of Desmodur® N3300 isocyanate cross-linker (Bayer) was added with mixing.

Formulation D5 (no TBAOH) 244.2 g of a 15 wt % polyelectrolyte solution in N-methylpyrrolidinone (NMP) and 569.8 g of a 14.9% solution of Kynar® 2801 PVDF (ATOFINA Chemicals) in NMP were mixed in a round bottom flask. Once a homogeneous solution was obtained, 0.38 g of Desmodur® N3300 isocyanate cross-linker (Bayer) was added to 35.61 g of the previous solution with mixing.

Formulation D6 (70% Kynar, 80% neutralization with TBAOH) 177.65 g of a polyelectrolyte solution in N-methylpyrrolidinone (NMP) and 35.83 g of a 55% water solution of tetrabutylammonium hydroxide (TBAOH) (available from Sachem) were mixed in a round bottom flask. After removing water by rotary evaporation, 42.0 g of a 15% solution of Kynar® 2801 PVDF (ATOFINA Chemicals) in NMP were added to 20.0 g of this solution. Once a homogeneous solution was obtained, 0.63 g of Desmodur® N3300 isocyanate cross-linker (Bayer) was added.

Example 16

For examples 16 through 20, the membranes were cast as shown in Table 11 and 12. The solution D1 was cast on the substrate, spread with a doctor knife (wet thickness=60 μm) and baked for 7 minutes at 177° C. After cooling, the solution D2 was cast on top of the previous membrane, spread with a doctor knife (wet thickness=300 μm) and baked for 7 minutes at 177° C. After cooling, the solution D1 was cast on top of the previous membrane, spread with a doctor knife (wet thickness=100 μm) and baked for 7 minutes at 177° C. The proton conductivity of the membrane, as measured by AC impedance, was 96 mS/cm at 70° C. and the areal resistance at 70° C. was 0.06 Ω/cm$^2$.

Example 17

The solution D4 was cast on the substrate, spread with a doctor knife (wet thickness=150 μm) and baked for 7 minutes at 177° C. After cooling of the aluminum foil, the solution D5 was cast on top of the previous membrane, spread with a doctor knife (wet thickness, including thickness of the previous membrane is 230 μm) and baked for 7 minutes at 177° C. The proton conductivity of the membrane, measured by AC impedance, was 28 mS/cm at 70° C. and the areal resistance at 70° C. was 0.11 Ω/cm$^2$.

Example 18

The solution D4 was cast on aluminum substrate, spread with a doctor knife (wet thickness=150 μm) and baked for 7 minutes at 177° C. After cooling, the solution D3 was cast on top of the previous membrane, spread with a doctor knife (wet thickness, including thickness of the previous membrane=230 μm) and baked for 7 minutes at 177° C. The membrane was protonated by treatments with one molar hydrochloric (HCl) and sulfuric ($H_2SO_4$) acids for 2 hours each at 65° C., and then rinsed with deionized water. The proton conductivity of the membrane, as measured by AC impedance at 70° C. is 70 mS/cm and 33 mS/cm, respectively, on the bottom and top sides of the membrane. The corresponding areal resistances at 70° C. were 0.043 $\Omega/cm^2$ and 0.09 $\Omega/cm^2$.

Example 19

The solution D3 was cast on aluminum substrate, spread with a doctor knife (wet thickness=150 μm) and baked for 7 minutes at 177° C. After cooling, the solution D4 was cast on top of the previous membrane, spread with a doctor knife (wet thickness, including thickness of the previous membrane=230 μm) and baked for 7 minutes at 177° C. The membrane was protonated by treatments with one molar hydrochloric (HCl) and sulfuric ($H_2SO_4$) acids for 2 hours each at 65° C., and then rinsed with deionized water. The proton conductivity of the membrane, by AC impedance, was measured at 70° C. as 33 mS/cm and 35 mS/cm, respectively, on the bottom and top sides of the membrane. The corresponding areal resistances at 70° C. were 0.132 $\Omega/cm^2$ and 0.124 $\Omega/cm^2$.

Example 20

The solution D6 was cast on aluminum substrate, spread with a doctor knife (wet thickness=150 μm) and baked for 7 minutes at 177° C. After cooling, the solution D6 was cast on top of the previous membrane, spread with a doctor knife (wet thickness, including thickness of the previous membrane=230 μm) and baked for 7 minutes at 177° C. The membrane was protonated by treatments with one molar hydrochloric (HCl) and sulfuric ($H_2SO_4$) acids for 2 hours each at 65° C. and then rinsed with deionized water. The proton conductivity of the membrane, measured by AC impedance at 70° C. was 55 mS/cm and 48 mS/cm, respectively, on the bottom and top sides of the membrane. The corresponding areal resistances at 70° C. were 0.12 $\Omega/cm^2$ and 0.14 $\Omega/cm^2$.

TABLE 11

Examples 16-20
Nature of the formulations for multi-layer membranes.

| Formulation # | Kynar ® grade | Kynar ®/ polyelectrolyte wt ratio | % neutralization of sulfonate groups with TBAOH | Isocyanate nature | Isocyanate/cross-linkable group ratio |
|---|---|---|---|---|---|
| D1 | 2801 | 70/30 | 0 | BL3175A | 1.01 |
| D2 | 2801 | 70/30 | 80% TBPOH | BL3175A | 1.01 |
| D3 | 2801 | 80/20 | 80 | N 3300 | 1.01 |
| D4 | 2801 | 80/20 | 0 | N 3300 | 1.02 |
| D5 | 2801 | 70/30 | 0 | N 3300 | 1.01 |
| D6 | 2801 | 70/30 | 80 | N 3300 | 1.0 |

TABLE 12

Examples 16-20 - Nature of the five membranes cast.

| Example # | First layer formulation | First layer Kynar ®/ polyelectrolyte wt ratio - composition | Second layer formulation | Second layer Kynar ®/ polyelectrolye - composition | Third layer formulation | Third layer Kynar ®/ polyelectrolyte - composition |
|---|---|---|---|---|---|---|
| 16 | D1 | 70/30 no counter ion | D2 | 70/30 TBP as counter ion | D1 | 70/30 no counter ion |
| 17 | D4 | 80/20 no counter ion | D5 | 70/30 no counter ion | — | — |
| 18 | D4 | 80/20 no counter ion | D3 | 80/20 TBA as counter ion | — | — |
| 19 | D3 | 80/20 TBA as counter ion | D4 | 80/20 no counter ion | — | — |
| 20 | D6 | 70/30 TBA as counter ion | D6 | 70/30 TBA as counter ion | — | — |

Scanning electron microscopy (SEM) and differential interference contrast optical microscopy (DICOM) images clearly showed that multi-layer membranes had successfully been prepared (see FIGS. 3-6).

Proton Conductivity Measurements

Table 13 below lists the conductivity values. All these conductivities are adequate for fuel cell applications

TABLE 13

Example 16-20 - Conductivities in water for multi-layer membranes.

| Example # | Conductivity @25° C. (mS/cm) | Conductivity @70° C. (mS/cm) | Wet thickess (μm) | Areal res. @25° C. (Ω/cm$^2$) | Areal res. @70° C. (Ω/cm$^2$) |
|---|---|---|---|---|---|
| 16 | 60 | 96 | 36 | 0.06 | 0.04 |
| 17 | 15 | 28 | 30 | 0.20 | 0.11 |
| 18 Bottom side | 39 | 70 | 30 | 0.076 | 0.043 |
| 18 Top side | 17 | 33 | 30.5 | 0.18 | 0.091 |
| 19 Bottom side | 17 | 33 | 44 | 0.25 | 0.13 |
| 19 Top side | 18 | 35 | 44 | 0.25 | 0.12 |
| 20 Bottom side | 33 | 55 | 66 | 0.20 | 0.12 |
| 20 Top side | 27 | 48 | 66 | 0.24 | 0.14 |

In examples 16-20, a variety of multi-layer membranes were formed. The formulations of D2, D3, and D6 had small domain sizes for the acrylic resin since the membrane layer containing D2, D3, or D6 was prepared using the ammonium or phosphonium compound as shown in Table 11, wherein this ammonium or phosphonium salt was subsequently removed upon formation of the membrane layer. Table 11 provides an estimate of the percent of the sulfanate groups which were neutralized with the ammonium or phosphonium compound. It is estimated that the domain sizes for these formulations were 500 nm or less. The formulations of D1, D4, and D5 did not use any ammonium or phosphonium compounds and therefore the domain sizes for the polyelectrolyte acrylic resins in these formulations was approximately 1,000 nm or higher. Also, in these examples, essentially the dry thickness of the multi-layer membranes upon formation was about 2 mils or less. In some examples, the multi-layer membrane thickness was about 1 mil or less upon drying. These low thicknesses are even more impressive in view of the fact that the areal resistance was very low, such as 0.3 Ω/cm$^2$ or lower for total wet thickness layers of 2 mils or less. This is very low resistance for a thin membrane and yet maintaining acceptable conductivity.

As can be seen from Table 12, a variety of multi-layer membranes were casted wherein in some examples, the first layer contained large domain sizes and in other examples, the first layer contained small domain sizes for the acrylic resin.

It is noted that the membrane set forth herein were prepared in the same manner as set forth in the earlier examples.

Thus, in certain multi-layer membranes such as example 17, the multi-layer structure did not contain any small domain sizes for the acrylic resin. In examples like example 18, one layer contained polyelectrolyte acrylic resin having domain sizes below 500 nm. In another example, such as example 20, the multi-layer membrane contained two layers wherein each layer contained small domain sizes for the polyelectrolyte acrylic resin. As can be seen from Table 13 which sets forth the conductivities in water for these various multi-layer membranes, wherein the testing was done as in the earlier examples, it can be seen that the areal resistance was quite low and below 0.3 Ωcm$^2$. This low resistance was irrespective of the domain sizes of the acrylic resin present in one or more layers. Thus, the use of a multi-layer membrane wherein at least one layer contains the polyelectrolyte having at least one acrylic and/or vinyl resin or both having at least one ionic or ionizable group along with one additional polymer leads to an acceptable multi-layer membrane which is useful in a variety of products such as fuel cells.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A multi-layer polyelectrolyte membrane comprising two or more layers, wherein at least one of said layers comprises:
   a) at least one acrylic and/or vinyl resin or both having at least one ionic or ionizable group and said a) is present in average domain sizes of from 1 to 500 nm; and
   b) at least one additional polymer, wherein a) and b) are different, wherein said at least one ionic or ionizable group is present in an amount of from about 200 to about 2,500 EW, and wherein said membrane has a methanol crossover rate of $5 \times 10^{-16}$ mol/cm$^2$/s or lower, and
wherein at least one other layer comprises
   c) at least one acrylic and/or vinyl resin or both having at least one ionic or ionizable group; and
   d) at least one additional polymer, wherein c) and d) are different, wherein said at least one ionic or ionizable group is present in an amount of from about 200 to about 2,500 EW and wherein said other layer has the same or different composition as the first layer
   e) neutralizing the acrylic and/or vinyl resin by adding ammonium and/or phosphonium.

2. The multi-layer membrane of claim 1, wherein the thickness of each layer is the same.

3. The multi-layer membrane of claim 1, wherein the thickness of each layer is different.

4. A membrane electrode assembly comprising the multi-layer polyelectrolyte membrane of claim 1.

5. A fuel cell comprising the membrane electrode assembly of claim 4.

6. A fuel cell comprising anode and cathode compartments separated by the multi-layer polyelectrolyte membrane of claim 1.

7. The fuel cell of claim 6, wherein said fuel cell operates with a liquid hydrocarbon fuel.

8. The fuel cell of claim 6, wherein said fuel cell operates with a methanol fuel.

9. A battery comprising anode and cathode compartments separated by the multi-layer polyelectrolyte membrane of claim 1.

10. The multi-layer polyelectrolyte membrane of claim 1, wherein said at least one additional polymer b) and/or d) is a fluoropolymer.

11. The multi-layer polyelectrolyte membrane of claim 1, wherein said membrane has a conductivity of 20 mS/cm or greater.

12. The multi-layer polyelectrolyte membrane of claim 11, wherein said conductivity is from about 50 mS/cm to about 200 mS/cm.

13. The multi-layer polyelectrolyte membrane of claim 1, wherein the membrane has a total thickness of from about 0.5 to about 10 mils.

14. The multi-layer polyelectrolyte membrane of claim 1, wherein the multi-layer polyelectrolyte membrane is non-perfluoronated.

15. The multi-layer polyelectrolyte membrane of claim 1, wherein said at least one ionic or ioniziable group of both a) and c) is a sulfonate, phosphonate, a sulfonated group, a phosphonated group, a sulfonyl group, or combinations thereof.

16. The multi-layer polyelectrolyte membrane of claim 1, wherein the acrylic resin or vinyl resin of both a) and c) has an equivalent weight of from about 200 to about 8,000 EW.

17. The multi-layer polyelectrolyte membrane of claim 1, wherein said membrane has a methanol crossover rate of $3 \times 10^{-16}$ mol/cm$^2$/s or lower.

18. A multi-layer polyelectrolyte membrane comprising two or more layers, wherein one of said layers comprises:
   a) at least one acrylic and/or vinyl resin or both having at least one ionic or ionizable group and said a) is present in average domain sizes of from 1 to 500 nm or less; and
   b) at least one additional polymer, wherein a) and b) are different, wherein said at least one ionic or ionizable group is present in an amount of from about 200 to about 2,500 EW, and wherein said membrane has an areal resistance of 0.3 Ω/cm$^2$ or lower,
wherein at least one other layer comprises:
   c) at least one acrylic and/or vinyl resin or both having at least one ionic or ionizable group; and
   d) at least one additional polymer, wherein a) and b) are different, wherein said at least one ionic or ionizable group is present in an amount of from about 200 to about 2,500 EW, wherein said other layer has the same or different composition as the first layer.

19. The multi-layer membrane of claim 18, wherein the thickness of each layer is the same.

20. The multi-layer membrane of claim 18, wherein the thickness of each layer is different.

21. A membrane electrode assembly comprising the polyelectrolyte membrane of claim 18.

22. A fuel cell comprising the membrane electrode assembly of claim 21.

23. A fuel cell comprising anode and cathode compartments separated by a polyelectrolyte membrane of claim 18.

24. The fuel cell of claim 23, wherein said fuel cell operates with a liquid hydrocarbon fuel.

25. The fuel cell of claim 23, wherein said fuel cell operates with a methanol fuel.

26. A battery comprising anode and cathode compartments separated by the multi-layer polyelectrolyte membrane of claim 18.

27. The multi-layer polyelectrolyte membrane of claim 1, wherein said multi-layer polyelectrolyte membrane comprises three layers.

28. The multi-layer polyelectrolyte membrane of claim 1, wherein said first layer has a different composition from said other layer.

29. The multi-layer polyelectrolyte membrane of claim 1, wherein said first layer and said other layer have the same composition.

30. The multi-layer polyelectrolyte membrane of claim 1, wherein said one other layer comprises a perfluorinated sulfonated material.

31. The multi-layer polyelectrolyte membrane of claim 1, wherein said multi-layer polyelectrolyte membrane comprises at least three layers, wherein said third layer comprises:
   e) at least one acrylic and/or vinyl resin or both having at least one ionic or ionizable group; and
   f) at least one additional polymer, wherein e) and f) are different, wherein said at least one ionic or ionizable group is present in an amount of from about 200 to about 2,500 EW and wherein said third layer has the same or different composition as the first layer or said other layer.

32. The multi-layer polyelectrolyte membrane of claim 1, wherein said membrane has an areal resistance of 0.35 Ω/cm$^2$ or lower.

33. The multi-layer polyelectrolyte membrane of claim 18, wherein said membrane has an areal resistance of 0.1 Ω/cm$^2$ or lower.

34. The multi-layer polyelectrolyte membrane of claim 18, wherein said membrane has an areal resistance of from 0.05 to about 0.3 Ω/cm$^2$.

35. The multi-layer polyelectrolyte membrane of claim 18, wherein said multi-layer polyelectrolyte membrane comprises three layers.

36. The multi-layer polyelectrolyte membrane of claim 18, wherein said first layer has a different composition from said other layer.

37. The multi-layer polyelectrolyte membrane of claim 18, wherein said first layer and said other layer have the same composition.

38. The multi-layer polyelectrolyte membrane of claim 18, wherein said one other layer comprises a perfluorinated sulfonated material.

39. The multi-layer polyelectrolyte membrane of claim 18, wherein said a) in said first layer has a domain size of 500 nm or less and said a) in said other layer has a domain size of 500 nm or less.

40. The multi-layer polyelectrolyte membrane of claim 1, wherein said multi-layer polyelectrolyte membrane has a total thickness of 1.75 mil or less.

41. The multi-layer polyelectrolyte membrane of claim 1, wherein said multi-layer polyelectrolyte membrane has a total thickness of from 0.5 mil to 1.5 mil.

42. The multi-layer polyelectrolyte membrane of claim 18, wherein said multi-layer polyelectrolyte membrane has a total thickness of 1.75 mil or less.

43. The multi-layer polyelectrolyte membrane of claim 18, wherein said multi-layer polyelectrolyte membrane has a total thickness of from about 0.5 mil to 1.5 mil.

44. The polyelectrolyte membrane of claim 18 having a total thickness of 1.75 mil or less wherein said membrane has an areal resistance of 0.3 Ω/cm$^2$ or lower.

45. The polyelectrolyte membrane of claim 44, wherein said membrane has an areal resistance of 0.1 Ω/cm$^2$ or lower.

46. The polyelectrolyte membrane of claim 44, wherein said membrane has an areal resistance of from about 0.05 to about 0.3 Ω/cm$^2$.

47. The polyelectrolyte membrane of claim 44, wherein said thickness is from 0.5 mil to 1.75 mil.

48. The polyelectrolyte membrane of claim 44, wherein said thickness is from 0.75 to 1.5 mil.

* * * * *